US012775151B2

(12) United States Patent
Jang et al.

(10) Patent No.: US 12,775,151 B2
(45) Date of Patent: Oct. 27, 2026

(54) IMAGING LENS SYSTEM

(71) Applicant: SAMSUNG ELECTRO-MECHANICS CO., LTD., Suwon-si (KR)

(72) Inventors: Sang Hyun Jang, Suwon-si (KR); Il Yong Park, Suwon-si (KR); Jae Hyuk Huh, Suwon-si (KR); Dong Hyuk Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 570 days.

(21) Appl. No.: 18/096,148

(22) Filed: Jan. 12, 2023

(65) Prior Publication Data

US 2024/0036290 A1 Feb. 1, 2024

(30) Foreign Application Priority Data

Jul. 21, 2022 (KR) ........................ 10-2022-0090495

(51) Int. Cl.
*G02B 13/00* (2006.01)
*G02B 9/64* (2006.01)

(52) U.S. Cl.
CPC ........... *G02B 9/64* (2013.01); *G02B 13/0045* (2013.01)

(58) Field of Classification Search
CPC .............................. G02B 9/64; G02B 13/0045
See application file for complete search history.

(56) References Cited

U.S. PATENT DOCUMENTS

| | | | |
|---|---|---|---|
| 2016/0178875 A1 | 6/2016 | Matsumura et al. |
| 2017/0329108 A1 | 11/2017 | Hashimoto |
| 2019/0056568 A1 | 2/2019 | Huang |
| 2020/0110247 A1 | 4/2020 | Jhang et al. |
| 2020/0249439 A1 | 8/2020 | Song et al. |
| 2020/0285017 A1 | 9/2020 | Jhang et al. |
| 2021/0055520 A1 | 2/2021 | Yan et al. |
| 2021/0132336 A1 | 5/2021 | Chen et al. |
| 2021/0149158 A1 | 5/2021 | Hsueh et al. |

(Continued)

FOREIGN PATENT DOCUMENTS

| | | | |
|---|---|---|---|
| CN | 110471168 A | 11/2019 | |
| CN | 112987258 A * | 6/2021 | ............. H04N 23/55 |

(Continued)

OTHER PUBLICATIONS

CN-112987258-A, translation (Year: 2021).*

(Continued)

*Primary Examiner* — Wen Huang
(74) *Attorney, Agent, or Firm* — NSIP Law

(57) ABSTRACT

An imaging lens system includes a first lens, a second lens, a third lens, a fourth lens, a fifth lens, a sixth lens, a seventh lens, and an eighth lens disposed in order from an object side, wherein the first lens has positive refractive power, wherein the fourth lens has a concave image-side surface, wherein the seventh lens has positive refractive power and has a convex object-side surface, and wherein the imaging lens system satisfies a conditional expression as follows: $0.12<G12/G45<0.52$ where G12 is a distance from an image-side surface of the first lens to an object-side surface of the second lens, and G45 is a distance from an image-side surface of the fourth lens to an object-side surface of the fifth lens.

8 Claims, 20 Drawing Sheets

(56) References Cited

U.S. PATENT DOCUMENTS

| | | | | | |
|---|---|---|---|---|---|
| 2021/0157104 | A1 | 5/2021 | Jung et al. | | |
| 2021/0191081 | A1 | 6/2021 | Dong et al. | | |
| 2021/0364752 | A1 | 11/2021 | Peng | | |
| 2022/0179176 | A1 | 6/2022 | Lai et al. | | |
| 2023/0122006 | A1 | 4/2023 | Huh et al. | | |
| 2023/0204914 | A1* | 6/2023 | Jhang | G02B 9/64 | 359/692 |
| 2023/0204917 | A1* | 6/2023 | Kao | G02B 9/64 | 359/708 |
| 2023/0221530 | A1 | 7/2023 | Zhu et al. | | |

FOREIGN PATENT DOCUMENTS

| | | | | | |
|---|---|---|---|---|---|
| CN | 113156619 | A | * | 7/2021 | G02B 13/0045 |
| CN | 213659078 | U | | 7/2021 | |
| CN | 113359274 | A | | 9/2021 | |
| CN | 113900226 | A | * | 1/2022 | G02B 13/0045 |
| CN | 114019658 | A | | 2/2022 | |
| CN | 114355569 | A | | 4/2022 | |
| CN | 217385971 | U | | 9/2022 | |
| JP | 2021-189427 | A | | 12/2021 | |
| TW | M600398 | U | | 8/2020 | |
| TW | 202034004 | A | | 9/2020 | |
| TW | 202120984 | A | | 6/2021 | |
| TW | 202223479 | A | | 6/2022 | |

OTHER PUBLICATIONS

CN-113156619-A, translation (Year: 2021).*

CN-113900226-A (Year: 2022).*

Taiwanese Office Action Issued on Apr. 15, 2025, in Counterpart Taiwanese Patent Application No. 113125206 (7 Pages in English, 4 Pages in Chinese).

Korean Office Action issued on Aug. 29, 2024, in counterpart Korean Patent Application No. 10-2022-0090495 (11 pages in English, 8 pages in Korean).

Taiwanese Office Action issued on Aug. 23, 2024, in counterpart Taiwanese Patent Application No. 113125206 (5 pages in English, 5 pages in Chinese).

Chinese Office Action issued on Jun. 14, 2023, in counterpart Chinese Patent Application No. 202320660780.7 (2 pages in English, 2 pages in Chinese).

Taiwanese Office Action issued on Aug. 14, 2023, in counterpart Taiwanese Patent Application No. 112101458 (5 pages in English, 6 pages in Chinese).

Chinese Office Action Issued on Nov. 15, 2025, in Counterpart Chinese Patent Application No. 202310368886.4 (3 Pages in English, 5 Pages in Chinese).

Taiwanese Office Action issued on Mar. 10, 2026, in corresponding Taiwanese Patent Application No. 115100222 (9 pages in English and 8 pages in Taiwanese).

* cited by examiner

IMAGING LENS SYSTEM

CROSS-REFERENCE TO RELATED APPLICATIONS

This application claims the benefit under 35 USC 119(a) of Korean Patent Application No. 10-2022-0090495 filed on Jul. 21, 2022, in the Korean Intellectual Property Office, the entire disclosure of which is incorporated herein by reference for all purposes.

BACKGROUND

1. Field

Embodiments of the present disclosure relate to an imaging lens system which may implement high-quality images even in a low-light environment.

2. Description of the Background

A portable electronic device may include a camera module to obtain images or videos. For example, a camera module may be mounted on a mobile phone, a laptop computer, a gaming device, or the like.

Resolution of a camera module may be affected by illuminance of a place in which photographing is carried out together with optical characteristics of an imaging lens system. For example, high-resolution images may be obtained in a bright place, but it may be difficult to obtain high-resolution images in a dark place. Therefore, it may be necessary to develop an imaging lens system having a low f-number to obtain high-resolution images even in a dark place.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one genera aspect, an imaging lens system includes a first lens, a second lens, a third lens, a fourth lens, a fifth lens, a sixth lens, a seventh lens, and an eighth lens disposed in order from an object side, wherein the first lens has positive refractive power, wherein the fourth lens has a concave image-side surface, wherein the seventh lens has positive refractive power and has a convex object-side surface, and wherein the imaging lens system satisfies a conditional expression as follows: $0.12<G12/G45<0.52$ where G12 is a distance from an image-side surface of the first lens to an object-side surface of the second lens, and G45 is a distance from an image-side surface of the fourth lens to an object-side surface of the fifth lens.

The imaging lens system may satisfy a conditional expression as follows: $0.570<TTL/2ImgHT<0.660$ where TTL is a distance from an object-side surface of the first lens to an imaging plane, and 2ImgHT is a diagonal length of the imaging plane.

The imaging lens system may satisfy a conditional expression as follows: $0.70<f/f1<1.30$ where f is a focal length of the imaging lens system, and f1 is a focal length of the first lens.

The imaging lens system may satisfy a conditional expression as follows: $|f/f6|<0.30$ where f6 is a focal length of the sixth lens.

The imaging lens system may satisfy a conditional expression as follows: $0.30<|f/f7|<1.20$ where f7 is a focal length of the seventh lens.

The imaging lens system may satisfy a conditional expression as follows: $2.10<|f2/f8|<3.40$ where f2 is a focal length of the second lens, and f8 is a focal length of the eighth lens.

The imaging lens system may satisfy a conditional expression as follows: $0.10<G56/G78<1.30$ where G56 is a distance from an image-side surface of the fifth lens to an object-side surface of the sixth lens, and G78 is a distance from an image-side surface of the seventh lens to an object-side surface of the eighth lens.

The imaging lens system may satisfy a conditional expression as follows: $0.30<T1/G78<1.80$ where T1 is a thickness at a center of an optical axis of the first lens.

In another general aspect, an imaging lens system includes a first lens, a second lens, a third lens, a fourth lens, a fifth lens, a sixth lens, a seventh lens, and an eighth lens disposed in order from an object side, wherein the fourth lens and the sixth lens each have a concave image-side surface, and the imaging lens system satisfies a conditional expression as follows: f-number<1.70, and $0.90<f/f1<1.10$ where f is a focal length of the imaging lens system, and f1 is a focal length of the first lens.

The first lens may have a concave image-side surface.

The second lens may have a convex object-side surface.

The third lens may have positive refractive power.

The imaging lens system may satisfy a conditional expression as follows: $0.08<|f/f5|<0.30$ where f5 is a focal length of the fifth lens.

The imaging lens system may satisfy a conditional expression as follows: $0.005<|f/f6|<0.10$ where f6 is a focal length of the sixth lens.

The imaging lens system may satisfy a conditional expression as follows: $0.40<|f/f7|<1.20$ where f7 is a focal length of the seventh lens.

The imaging lens system may satisfy a conditional expression as follows: $1.0<|f/f8|<1.40$ where f8 is a focal length of the eighth lens.

The imaging lens system may satisfy a conditional expression as follows: $0.580<TTL/2ImgHT<0.660$ where TTL is a distance from an object-side surface of the first lens to an imaging plane, and 2ImgHT is a diagonal length of the imaging plane.

In another general aspect, an imaging lens system includes a first lens, a second lens, a third lens, a fourth lens, a fifth lens, a sixth lens, a seventh lens, and an eighth lens disposed in order from an object side, wherein the first lens has positive refractive power, wherein the fourth lens has a concave image-side surface, wherein the seventh lens has positive refractive power and has a convex object-side surface, and wherein the imaging lens system satisfies a conditional expression as follows: $2.80<(|f2|+|f8|)/f<3.0$ where f is a focal length of the imaging lens system, f2 is a focal length of the second lens, and f8 is a focal length of the eighth lens.

The imaging lens system may satisfy a conditional expression as follows: $0.570<TTL/2ImgHT<0.590$ where TTL is a distance from an object-side surface of the first lens to an imaging plane, and 2ImgHT is a diagonal length of the imaging plane.

The fifth lens may have a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
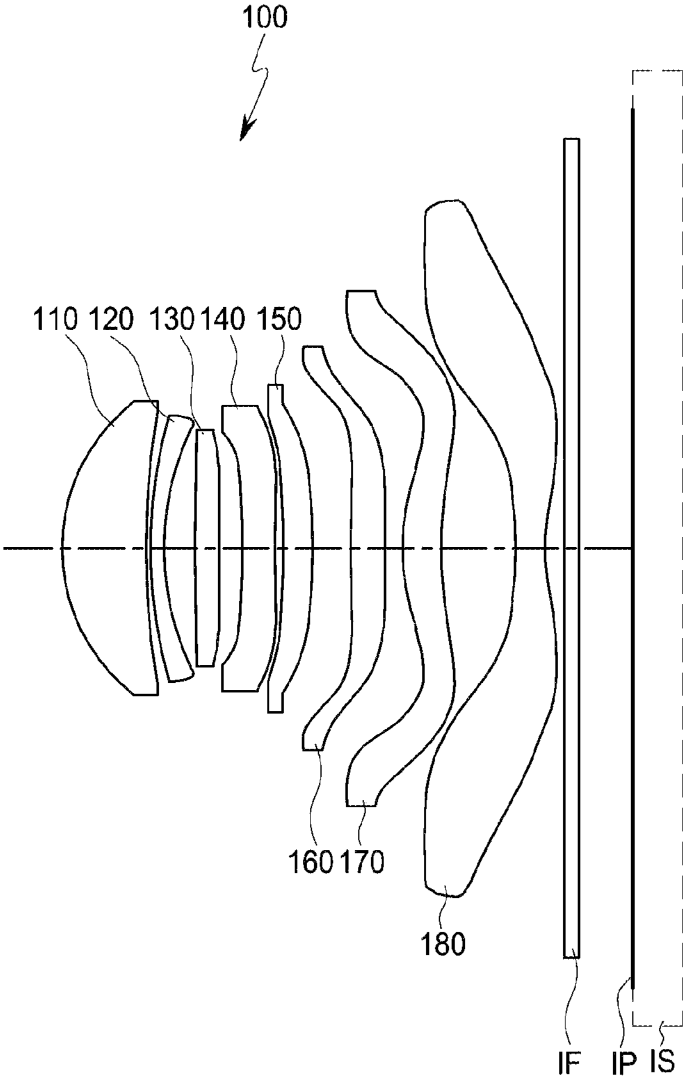
FIG. 1 is a diagram illustrating an imaging lens system according to a first embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining an understanding of this disclosure. For example, the sequences of operations described herein are merely examples, and are not limited to those set forth herein, but may be changed as will be apparent after gaining an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An embodiment of the present disclosure is to provide an imaging lens system which may obtain high-quality images even in a low-light environment.

Also, an embodiment of the present disclosure is to provide an imaging lens system which may have a wide field of view with a low f-number.

In the embodiments, a first lens refers to a lens most adjacent to an object (or a subject), and an eighth lens refers to a lens most adjacent to an imaging plane (or an image sensor). In the embodiments, a unit of a radius of curvature, a thickness, a TTL (a distance from an object-side surface of the first lens to an imaging plane), an ImgH (a height of an imaging plane), a focal length, and an effective diameter are indicated in millimeters (mm).

A thickness of a lens, a gap between lenses, and a TTL refer to a distance of a lens on an optical axis. Also, in the descriptions of a shape of a lens, a configuration in which one surface is convex indicates that a paraxial region of the surface is convex, while a configuration in which one surface is concave indicates that a paraxial region of the surface is concave. Thus, even when it is described that one surface of a lens is convex, an edge of the one surface of the lens may be concave. Similarly, even when it is described that one surface of a lens is concave, an edge of the one surface of the lens may be convex.

The imaging lens system described herein may be configured to be mounted on a portable electronic device. For example, the imaging lens system may be mounted on a smartphone, a notebook computer, an augmented reality device, a virtual reality device (VR), a portable gaming device, or the like. However, the range and examples of use of the imaging lens system described herein are not limited to the above-described electronic devices. For example, the imaging lens system may be applied to electronic devices providing a narrow mounting space but requiring high-resolution imaging.

The imaging lens system according to the first embodiment may include a plurality of lenses. For example, the imaging lens system may include a first lens, a second lens, a third lens, a fourth lens, a fifth lens, a sixth lens, a seventh lens, and an eighth lens disposed in order from an object side. For example, the imaging lens system may have no more than eight lenses. The imaging lens system according to the first embodiment may include a plurality of lenses having positive refractive power. For example, in the imaging lens system according to the first embodiment, both the first lens and the seventh lens may have positive refractive power. The imaging lens system according to the first embodiment may include a lens having a concave image-side surface. For example, in the imaging lens system according to the first embodiment, the fourth lens may have a concave image-side surface. The imaging lens system according to the first embodiment may include a lens having a convex object-side surface. For example, in the imaging lens system according to the first embodiment, the seventh lens may have a convex object-side surface. The imaging lens system according to the first embodiment may satisfy a predetermined conditional expression. For example, the imaging lens system according to the first embodiment may satisfy a conditional expression as below:

$$0.12 < G12/G45 < 0.52$$

In the conditional expression, G12 is the distance from an image-side surface of the first lens to an object-side surface of the second lens, and G45 is the distance from an image-side surface of the fourth lens to an object-side surface of the fifth lens.

The imaging lens system according to the second embodiment may include a plurality of lenses. For example, the imaging lens system may include a first lens, a second lens, a third lens, a fourth lens, a fifth lens, a sixth lens, a seventh lens, and an eighth lens disposed in order from an object side. The imaging lens system according to the second embodiment may include a lens of which one side surface is concave. For example, in the imaging lens system according to the second embodiment, the fourth lens and the sixth lens may have a concave image-side surface. The imaging lens system according to the second embodiment may satisfy a predetermined conditional expression. For example, the imaging lens system according to the second embodiment may satisfy the entirety of the conditional expressions as below:

$$f\text{-number} < 1.70$$

$$0.90 < f/f1 < 1.10$$

In the conditional expression, f is the focal length of the imaging lens system, and f1 is the focal length of the first lens.

The imaging lens system according to the third embodiment may include a plurality of lenses. For example, the imaging lens system may include a first lens, a second lens, a third lens, a fourth lens, a fifth lens, a sixth lens, a seventh lens, and an eighth lens disposed in order from an object side. The imaging lens system according to the third embodiment may include a lens of which one side surface is concave. For example, in the imaging lens system according to the third embodiment, the first lens, the third lens, and the fourth lens may have a concave image-side surface. The imaging lens system according to the third embodiment may include a lens having negative refractive power. For example, in the imaging lens system according to the third embodiment, the second lens may have negative refractive power. The imaging lens system according to the third embodiment may include a lens of which both surfaces are convex. For example, in the imaging lens system according to the third embodiment, the fifth lens may have a convex object-side surface and a convex image-side surface. The imaging lens system according to the third embodiment may have a low f-number. For example, the imaging lens system according to the third embodiment may have an f-number of less than 1.9. As another example, the imaging lens system according to the third embodiment may have an f-number of less than 1.7. As another example, the imaging lens system according to the third embodiment may have an f-number of 1.67 or less and 1.57 or more.

The imaging lens system according to the fourth embodiment may include a first lens, a second lens, a third lens, a fourth lens, a fifth lens, a sixth lens, a seventh lens, and an eighth lens disposed in order from an object side. The imaging lens system according to the fourth embodiment may include a lens having positive refractive power. For example, in the imaging lens system according to the fourth embodiment, both the fifth lens and the seventh lens may have positive refractive power. The imaging lens system according to the fourth embodiment may have a low f-number. For example, the imaging lens system according to the fourth embodiment may have an f-number of less than 1.8. As another example, the imaging lens system according to the fourth embodiment may have an f-number of 1.67 or less.

The imaging lens system according to the fifth embodiment may include a first lens, a second lens, a third lens, a fourth lens, a fifth lens, a sixth lens, a seventh lens, and an eighth lens disposed in order from an object side. The imaging optical device according to the fifth embodiment may include a lens having positive refractive power. For example, in the imaging lens system according to the fifth embodiment, both the first lens and the seventh lens may have positive refractive power. The imaging lens system according to the fifth embodiment may satisfy a predetermined conditional expression. For example, the imaging lens system according to the fifth embodiment may satisfy the conditional expression as below:

$$2.80 < (|f2| + |f8|)/f < 3.0$$

In the conditional expression, f is the focal length of the imaging lens system, f2 is the focal length of the second lens, and f8 is the focal length of the eighth lens.

An imaging lens system according to a sixth embodiment may include a first lens, a second lens, a third lens, a fourth lens, a fifth lens, a sixth lens, a seventh lens, and an eighth lens, and may satisfy one or more of the conditional expressions as below:

$$f\text{-number} < 0.9$$

$$42° < HFOV$$

$$0.57 < TTL/2ImgHT < 0.66$$

$$0.70 < f/f1 < 1.30$$

$$0.30 < |f/f2| < 0.60$$

$$0.10 < |f/f3| < 0.30$$

$$0.10 < |f/f4| < 0.30$$

$$0.08 < |f/f5| < 0.30$$

$$|f/f6| < 0.30$$

$$0.30 < |f/f7| < 1.20$$

$$1.00 < |f/f8| < 1.40$$

$$2.10 < |f2/f8| < 3.40$$

-continued $$2.80 < (|f2| + |f8|)/f < 3.4$$

$$4.20 < (|f1| + |f2| + |f7| + |f8|)/f < 7.2$$

In the conditional expression, HFOV is the half field of view of the imaging lens system, TTL is the distance from an object-side surface of the first lens to the imaging plane, 2ImgHT is the diagonal length of the imaging plane, f is the focal length of the imaging lens system, f1 is the focal length of the first lens, f2 is the focal length of the second lens, f3 is the focal length of the third lens, f4 is the focal length of the fourth lens, f5 is the focal length of the fifth lens, f6 is the focal length of the sixth lens, f7 is the focal length of the seventh lens, and f8 is the focal length of the eighth lens.

The imaging lens system according to the sixth embodiment may satisfy a more limited numerical range as below as for a portion of conditional expressions.

$$f\text{-number} < 1.67$$

$$42.5° \leq HFOV < 50°$$

$$0.57 < TTL/2ImgHT < 0.59$$

$$0.90 < f/f1 < 1.10$$

$$|f/f6| < 0.10$$

$$0.40 < |f/f7| < 1.20$$

$$2.80 < (|f2| + |f8|)/f < 3.0$$

An imaging lens system according to a seventh embodiment may include a first lens, a second lens, a third lens, a fourth lens, a fifth lens, a sixth lens, a seventh lens, and an eighth lens, and may satisfy one or more of the conditional expressions as below:

$$0.12 > G12/G45 < 0.52$$

$$0.64 < G23/G34 < 1.64$$

$$0.10 < G56 < G78 < 1.30$$

$$0.30 < T1/G78 < 1.80$$

$$0.21 > T6/G78 < 0.58$$

$$0.80 < D15/(G56 + D68) < 1.10$$

In the conditional expression, G12 is the distance from an image-side surface of the first lens to an object-side surface of the second lens, G23 is the distance from an image-side surface of the second lens to an object-side surface of the third lens, G34 is the distance from an image-side surface of the fourth lens to an object-side surface of the fifth lens, G45 is the distance from an image-side surface of the fourth lens to an object-side surface of the fifth lens, G56 is the distance from an image-side surface of the fifth lens to the object-side surface of the sixth lens, G78 is the distance from an image-side surface of the seventh lens to an object-side surface of the eighth lens, T1 is the thickness at the center of the optical axis of the first lens, T6 is the thickness at the center of the optical axis of the sixth lens, D15 is the distance from an object-side surface of the first lens to an image-side surface of the fifth lens, and D68 is the distance from an object-side surface of the sixth lens to an image-side surface of the eighth lens.

The imaging lens system according to the seventh embodiment may satisfy a more limited numerical range as below as for some conditional expressions.

$$0.38 < G12/G45 < 0.52$$

$$0.52 < G56/G78 < 0.76$$

$$1.02 < T1/G78 < 1.52$$

$$0.32 < T6/G78 < 0.52$$

$$0.90 < D15/(G56 + D68) < 1.05$$

The imaging lens system according to the seventh embodiment may satisfy another numerical range as below as for some conditional expressions.

$$0.12 < G12/G45 < 0.42$$

An imaging lens system according to an eighth embodiment may include a first lens, a second lens, a third lens, a fourth lens, a fifth lens, a sixth lens, a seventh lens, and an eighth lens disposed in order from an object side, and may satisfy one or more of the conditional expressions as below:

$$-2.0 < R10/f5 < 2.0$$

$$0.10 < (R2 + R4)/(R6 + R8) < 1.40$$

$$0.08 < (R11 + R12)/(2 * R12) < 1.26$$

$$3.22 < Nd2 + Nd3 < 3.28$$

$$3.22 < Nd4 + Nd5 < 3.32$$

In the conditional expression, R2 is the radius of curvature of an image-side surface of the first lens, R4 is the radius of curvature of an image-side surface of the second lens, R6 is the radius of curvature of an image-side surface of the third lens, R8 is the radius of curvature of an image-side surface of the fourth lens, R10 is the radius of curvature of an image-side surface of the fifth lens, R11 is the radius of curvature of an object-side surface of the sixth lens, R12 is the radius of curvature of an image-side surface of the sixth lens, Nd2 is the refractive index of the second lens, Nd3 is the refractive index of the third lens, Nd4 is the refractive index of the fourth lens, and Nd5 is the refractive index of the fifth lens.

The imaging lens system according to the eighth embodiment may satisfy a more limited numerical range as below as for some conditional expressions.

$$-2.0 < R10/f5 < -0.80$$

$$0.26 < (R2 + R4)/(R6 + R8) < 0.42$$

$$0.86 < (R11 + R12)/(2 * R12) < 1.26$$

An imaging lens system according to a ninth embodiment may include a first lens, a second lens, a third lens, a fourth lens, a fifth lens, a sixth lens, a seventh lens, and an eighth lens disposed in order from an object side, and may satisfy one or more characteristics (conditional expressions) of the imaging lens system in the sixth to eighth embodiments. For example, the imaging lens system according to the ninth embodiment may satisfy the conditional expression $0.90<f/f1<1.30$, which is one of the characteristics of the imaging lens system according to the sixth embodiment, may satisfy the conditional expression $0.10<G56/G78<1.30$, which is one of the characteristics of the imaging lens system according to the seventh embodiment, and may satisfy $0.08<(R11+R12)/(2*R12)<1.26$, which is one of the characteristics of the imaging lens system according to the eighth embodiment.

The imaging lens systems according to the first to ninth embodiments may include one or more lenses having the characteristics as below, if desired. For example, the imaging lens system according to the first embodiment may include one of the first to eighth lenses according to the characteristics as below. As another example, the imaging lens system according to the second embodiment may include two or more of the first to eighth lenses according to the characteristics as below. However, the imaging lens system according to the above-described embodiment does not necessarily include the lens according to the characteristics as below.

Hereinafter, the characteristics of the first to eighth lenses will be described.

The first lens may have refractive power. For example, the first lens may have positive refractive power. One surface the first lens may be concave. For example, the first lens may have a concave image-side surface. The first lens may include a spherical surface or an aspherical surface. For example, both surfaces of the first lens may be aspherical. The first lens may be formed of a material having high light transmittance and excellent workability. For example, the first lens may be formed of a plastic material or a glass material. The first lens may be configured to have a predetermined refractive index. For example, the refractive index of the first lens may be less than 1.6. As a specific example, the refractive index of the first lens may be greater than 1.52 and less than 1.57. The first lens may have a predetermined Abbe number. For example, the Abbe number of the first lens may be less than 60. As a specific example, the Abbe number of the first lens may be greater than 53 and less than 58.

The second lens may have refractive power. For example, the second lens may have positive or negative refractive power. One surface of the second lens may be convex. For example, the second lens may have a convex object-side surface. The second lens may include a spherical surface or an aspherical surface. For example, both surfaces of the second lens may be aspherical. The second lens may be formed of a material having high light transmittance and excellent workability. For example, the second lens may be formed of a plastic material or a glass material. The second lens may be configured to have a predetermined refractive index. For example, the refractive index of the second lens may be greater than 1.6. As a specific example, the refractive index of the second lens may be greater than 1.65 and less than 1.70. However, when the refractive index of the third lens is 1.65 or more, the refractive index of the second lens may be less than 1.56. The second lens may have a predetermined Abbe number. For example, the Abbe number of the second lens may be less than 30. As a specific example, the Abbe number of the second lens may be greater than 16 and less than 20. However, when the Abbe number of the third lens is less than 20, the Abbe number of the second lens may be 54 or more.

The third lens may have refractive power. For example, the third lens may have positive or negative refractive power. One surface of the third lens may be concave. For example, the third lens may have a concave image-side surface. The third lens may include a spherical surface or an aspherical surface. For example, both surfaces of the third lens may be aspherical. The third lens may be formed of a material having high light transmittance and excellent workability. For example, the third lens may be formed of a plastic material or a glass material. The third lens may be configured to have a predetermined refractive index. For example, the refractive index of the third lens may be less than 1.6. As a specific example, the refractive index of the third lens may be greater than 1.52 and less than 1.57. However, when the refractive index of the second lens is less than 1.6, the refractive index of the third lens may be less than 1.65. The third lens may have a predetermined Abbe number. For example, the Abbe number of the third lens may be less than 60. As a specific example, the Abbe number of the third lens may be greater than 53 and less than 58. However, when the Abbe number of the second lens is 54 or more, the Abbe number of the third lens may be less than 20.

The fourth lens may have refractive power. For example, the fourth lens may have positive or negative refractive power. One surface of the fourth lens may be concave. For example, the fourth lens may have a concave image-side surface. The fourth lens may include a spherical surface or an aspherical surface. For example, both surfaces of the fourth lens may be aspherical. The fourth lens may be formed of a material having high light transmittance and excellent workability. For example, the fourth lens may be formed of a plastic material or a glass material. The fourth lens may be configured to have a predetermined refractive index. For example, the refractive index of the fourth lens may be greater than 1.6. As a specific example, the refractive index of the fourth lens may be greater than 1.65 and less than 1.69. However, when the refractive index of the fifth lens is 1.65 or more, the refractive index of the fourth lens may be less than 1.54. The fourth lens may have a predetermined Abbe number. For example, the Abbe number of the fourth lens may be less than 30. As a specific example, the Abbe number of the fourth lens may be greater than 16 and less than 20. However, when the Abbe number of the fifth lens is less than 20, the Abbe number of the fourth lens may be 55 or more.

The fifth lens may have refractive power. For example, the fifth lens may have positive or negative refractive power. At least one surface of the fifth lens may be convex or both surfaces may be concave. For example, the fifth lens may have a convex object-side surface or a convex image-side surface. As another example, both the object-side surface and the image-side surface of the fifth lens may be concave. The fifth lens may include a spherical surface or an aspherical surface. For example, both surfaces of the fifth lens may be aspherical. The fifth lens may be formed of a material having high light transmittance and excellent workability. For example, the fifth lens may be formed of a plastic material or a glass material.

The sixth lens may have refractive power. For example, the sixth lens may have positive or negative refractive power. One surface of the sixth lens may be convex. For example, the sixth lens may have a convex object-side surface. The sixth lens may include a spherical surface or an aspherical surface. For example, both surfaces of the sixth lens may be aspherical. An inflection point may be formed on one or both surfaces of the sixth lens. For example, an inflection point may be formed on an object-side surface and an image-side surface of the sixth lens. The sixth lens may be formed of a material having high light transmittance and excellent workability. For example, the sixth lens may be formed of a plastic material or a glass material.

The seventh lens may have refractive power. For example, the seventh lens may have positive refractive power. One surface of the seventh lens may be convex. For example, the seventh lens may have a convex object-side surface. The seventh lens may include a spherical surface or an aspherical surface. For example, both surfaces of the seventh lens may be aspherical. An inflection point may be formed on one or both surfaces of the seventh lens. For example, an inflection point may be formed on an object-side surface and an image-side surface of the seventh lens. Also, both concave and convex shapes may be formed together on one or both surfaces of the seventh lens. For example, the optical axis portion of an object-side surface of the seventh lens may be convex, and the peripheral portion on an object-side surface of the seventh lens may be concave. As another example, the optical axis portion may be concave on an image-side surface of the seventh lens, and the peripheral portion may be convex on an image-side surface of the seventh lens. The seventh lens may be formed of a material having high light transmittance and excellent workability. For example, the seventh lens may be formed of a plastic material or a glass material. The seventh lens may be configured to have a predetermined refractive index. For example, the refractive index of the seventh lens may be greater than 1.52. As a specific example, the refractive index of the seventh lens may be greater than 1.52 and less than 1.64. The seventh lens may have a predetermined Abbe number. For example, the Abbe number of the seventh lens may be less than 60. As a specific example, the Abbe number of the seventh lens may be greater than 32 and less than 57.

The eighth lens may have refractive power. For example, the eighth lens may have negative refractive power. One surface of the eighth lens may be concave. For example, the eighth lens may have a concave image-side surface. The eighth lens may include a spherical surface or an aspherical surface. For example, both surfaces of the eighth lens may be aspherical. An inflection point may be formed on one or both surfaces of the eighth lens. For example, an inflection point may be formed on an object-side surface and an image-side surface of the eighth lens. Also, concave and convex shapes may be formed on one or both surfaces of the eighth lens. For example, the optical axis portion on an image-side surface of the eighth lens may be concave, and the peripheral portion on an image-side surface of the eighth lens may be convex. The eighth lens may be formed of a material having high light transmittance and excellent workability. For example, the eighth lens may be formed of a plastic material or a glass material. The eighth lens may be configured to have a predetermined refractive index. For example, the refractive index of the eighth lens may be less than 1.6. As a specific example, the refractive index of the eighth lens may be greater than 1.50 and less than 1.57. The eighth lens may have a predetermined Abbe number. For example, the Abbe number of the eighth lens may be less than 60. As a specific example, the Abbe number of the eighth lens may be greater than 52 and less than 60.

The first to eighth lenses may include a spherical surface or an aspherical surface as described above. When the first to eighth lenses include an aspherical surface, the aspherical surface of the corresponding lens may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \ \ldots \quad \text{Equation 1}$$

In Equation 1, c is the reciprocal of the radius of curvature of the corresponding lens, k is the conic constant, r is the distance from an arbitrary point on the aspherical surface to the optical axis, A to H and J are aspherical constants, and Z (or SAG) is the height in the optical axis direction from an arbitrary point on the aspherical surface to the apex of the aspherical surface.

The imaging lens system according to the above-described embodiment or the above-described embodiment may further include a stop and a filter. As an example, the imaging lens system may further include a stop disposed on an object-side surface of the first lens or between the second lens and the third lens. As another example, the imaging lens system may further include a filter disposed between the eighth lens and the imaging plane. The stop may be configured to adjust the amount of light incident to the imaging plane, and the filter may be configured to block light of a specific wavelength. The filter described herein may be configured to block infrared rays, but light of a wavelength blocked through the filter is not limited to infrared rays.

Hereinafter, a specific embodiment of the imaging lens system will be described with reference to the drawings.

First, an imaging lens system according to a first embodiment will be described with reference to FIG. 1.

The imaging lens system 100 may include a first lens 110, a second lens 120, a third lens 130, a fourth lens 140, a fifth lens 150, a sixth lens 160, a seventh lens 170, and an eighth lens 180.

The first lens 110 may have positive refractive power, and may have a convex object-side surface and a concave image-side surface. The second lens 120 may have negative refractive power, and may have a convex object-side surface and a concave image-side surface. The third lens 130 may have positive refractive power, and may have a convex object-side surface and a concave image-side surface. The fourth lens 140 may have negative refractive power, and may have a convex object-side surface and a concave image-side surface. The fifth lens 150 may have positive refractive power, and may have a convex object-side surface and a convex image-side surface. The sixth lens 160 may have negative refractive power, and may have a convex object-side surface and a concave image-side surface. Also, an inflection point may be formed on an object-side surface and an image-side surface of the sixth lens 160. The seventh lens 170 may have positive refractive power, and may have a convex object-side surface and a concave image-side surface. Also, an inflection point may be formed on an object-side surface and an image-side surface of the seventh lens 170. The eighth lens 180 may have negative refractive power, and may have a convex object-side surface and a concave image-side surface. Also, an inflection point may be formed on an object-side surface and an image-side surface of the eighth lens 180.

The imaging lens system 100 may further include a filter IF and an imaging plane IP. The filter IF may be disposed between the eighth lens 180 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 2:
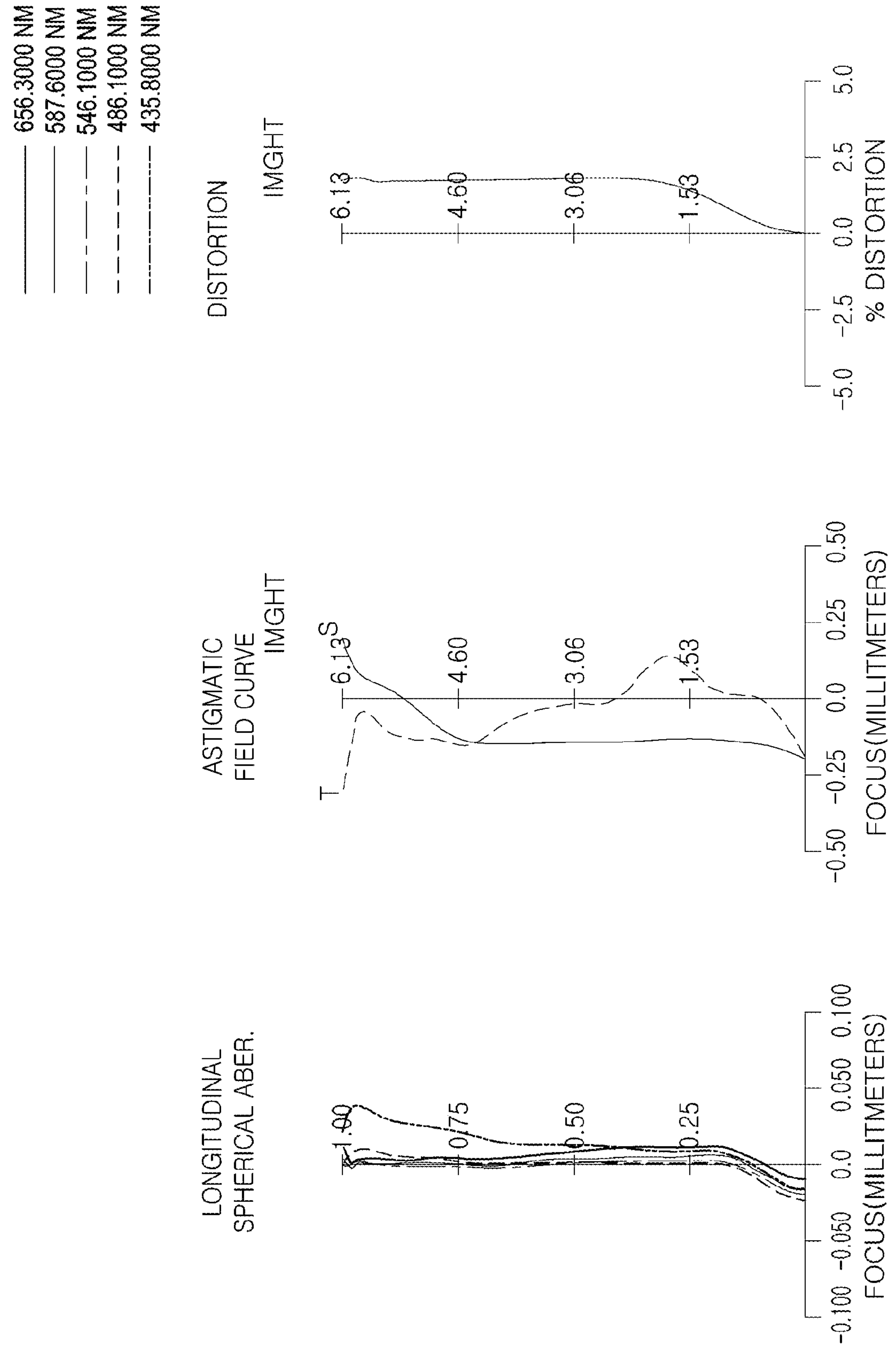
FIG. 2 is aberration curves of the imaging lens system illustrated in FIG. 1.

Tables 1 and 2 list the lens characteristics and aspheric values of the imaging lens system according to the present embodiment. FIG. 2 is aberration curves of the imaging lens system according to the present embodiment.

TABLE 1

| Surface No. | Components | Radius of curvature | Thickness/ Distance | Refractive index | Abbe number | Effective Radius |
|---|---|---|---|---|---|---|
| S1 | First lens | 2.763 | 1.173 | 1.546 | 55.990 | 2.108 |
| S2 | | 14.029 | 0.050 | | | 1.979 |
| S3 | Second lens | 8.043 | 0.210 | 1.679 | 19.238 | 1.906 |
| S4 | Stop | 4.406 | 0.422 | | | 1.749 |
| S5 | Third lens | 14.549 | 0.345 | 1.546 | 55.990 | 1.717 |
| S6 | | 29.993 | 0.306 | | | 1.645 |
| S7 | Fourth lens | 634.005 | 0.465 | 1.679 | 19.238 | 1.683 |
| S8 | | 19.917 | 0.107 | | | 2.044 |
| S9 | Fifth lens | 50.830 | 0.423 | 1.546 | 55.990 | 2.202 |
| S10 | | −79.060 | 0.545 | | | 2.343 |
| S11 | Sixth lens | 21.287 | 0.469 | 1.571 | 37.403 | 2.695 |
| S12 | | 14.362 | 0.237 | | | 2.911 |
| S13 | Seventh lens | 2.927 | 0.550 | 1.546 | 55.990 | 3.359 |
| S14 | | 15.390 | 1.026 | | | 3.693 |
| S15 | Eighth lens | 32.196 | 0.430 | 1.537 | 55.735 | 4.695 |
| S16 | | 2.499 | 0.241 | | | 4.925 |
| S17 | Filter | infinity | 0.210 | 1.519 | 64.197 | 5.645 |
| S18 | | infinity | 0.770 | | | 5.713 |
| S19 | Imaging plane | infinity | 0.020 | | | 6.131 |

TABLE 2

| Surface No. | S1 | S2 | S3 | S4 | S5 | S6 | S7 | S8 |
|---|---|---|---|---|---|---|---|---|
| K | −3.80E−01 | 2.06E+01 | −1.27E+01 | −3.97E+00 | 6.12E+00 | 9.86E+01 | 0.00E+00 | 0.00E+00 |
| 4th order term | 1.99E−03 | −2.56E−04 | −6.26E−03 | −1.94E−03 | −9.35E−03 | −8.49E−03 | −1.71E−02 | −9.37E−03 |
| 6th order term | 5.66E−03 | −3.12E−03 | 3.48E−04 | −6.29E−03 | −3.79E−03 | −3.09E−02 | 9.20E−03 | −2.52E−02 |
| 8th order term | −1.81E−02 | 9.15E−03 | 6.92E−03 | 3.26E−02 | 1.27E−02 | 1.40E−01 | −6.11E−02 | 7.52E−02 |
| 10th order term | 3.85E−02 | −1.23E−02 | −5.72E−03 | −6.90E−02 | −5.91E−02 | −4.45E−01 | 1.49E−01 | −1.50E−01 |
| 12th order term | −5.29E−02 | 8.90E−03 | −4.68E−03 | 9.17E−02 | 1.70E−01 | 9.46E−01 | −2.20E−01 | 2.04E−01 |
| 14th order term | 4.95E−02 | −1.45E−03 | 1.67E−02 | −7.55E−02 | −3.13E−01 | −1.40E+00 | 1.91E−01 | −1.97E−01 |
| 16th order term | −3.25E−02 | −3.75E−03 | −2.05E−02 | 3.24E−02 | 3.91E−01 | 1.48E+00 | −7.11E−02 | 1.38E−01 |
| 18th order term | 1.53E−02 | 4.27E−03 | 1.51E−02 | 2.52E−03 | −3.38E−01 | −1.14E+00 | −3.69E−02 | −7.06E−02 |
| 20th order term | −5.18E−03 | −2.45E−03 | −7.49E−03 | −1.28E−02 | 2.05E−01 | 6.31E−01 | 6.63E−02 | 2.65E−02 |
| 22nd order term | 1.25E−03 | 8.81E−04 | 2.55E−03 | 8.50E−03 | −8.74E−02 | −2.51E−01 | −4.29E−02 | −7.17E−03 |
| 24th order term | −2.10E−04 | −2.07E−04 | −5.88E−04 | −3.05E−03 | 2.55E−02 | 6.99E−02 | 1.61E−02 | 1.37E−03 |
| 26th order term | 2.33E−05 | 3.11E−05 | 8.85E−05 | 6.51E−04 | −4.87E−03 | −1.29E−02 | −3.67E−03 | −1.73E−04 |
| 28th order term | −1.53E−06 | −2.70E−06 | −7.84E−06 | −7.76E−05 | 5.47E−04 | 1.42E−03 | 4.73E−04 | 1.30E−05 |
| 30th order term | 4.54E−08 | 1.04E−07 | 3.10E−07 | 3.98E−06 | −2.75E−05 | −7.04E−05 | −2.67E−05 | −4.42E−07 |

| Surface No. | S9 | S10 | S11 | S12 | S13 | S14 | S15 | S16 |
|---|---|---|---|---|---|---|---|---|
| K | 9.90E+01 | −6.52E+01 | 0.00E+00 | −9.90E+01 | −1.17E+01 | 4.89E+00 | 2.81E+01 | −6.90E+00 |
| 4th order term | −2.53E−02 | −2.25E−02 | −5.21E−03 | −2.65E−02 | 6.99E−02 | 6.27E−02 | −9.30E−02 | −6.09E−02 |
| 6th order term | −4.33E−03 | −1.30E−02 | −2.78E−02 | −6.41E−02 | −9.30E−02 | −3.52E−02 | 2.98E−02 | 2.28E−02 |
| 8th order term | 2.12E−03 | 2.93E−02 | 5.76E−02 | 1.10E−01 | 7.75E−02 | 8.04E−03 | −8.65E−03 | −7.17E−03 |
| 10th order term | 2.41E−02 | −4.68E−02 | −6.97E−02 | −1.03E−01 | −5.05E−02 | −5.23E−04 | 2.18E−03 | 1.74E−03 |
| 12th order term | −6.19E−02 | 5.23E−02 | 5.69E−02 | 6.63E−02 | 2.44E−02 | −1.73E−04 | −4.04E−04 | −3.13E−04 |
| 14th order term | 7.98E−02 | −4.18E−02 | −3.35E−02 | −3.13E−02 | −8.63E−03 | 2.50E−05 | 5.32E−05 | 4.15E−05 |
| 16th order term | −6.50E−02 | 2.42E−02 | 1.45E−02 | 1.09E−02 | 2.22E−03 | 9.25E−06 | −5.05E−06 | −4.05E−06 |
| 18th order term | 3.57E−02 | −1.03E−02 | −4.58E−03 | −2.78E−03 | −4.13E−04 | −3.81E−06 | 3.50E−07 | 2.91E−07 |
| 20th order term | −1.35E−02 | 3.17E−03 | 1.06E−03 | 5.17E−04 | 5.54E−05 | 6.50E−07 | −1.77E−08 | −1.53E−08 |
| 22nd order term | 3.55E−03 | −7.01E−04 | −1.76E−04 | −6.89E−05 | −5.27E−06 | −6.47E−08 | 6.46E−10 | 5.86E−10 |
| 24th order term | −6.32E−04 | 1.08E−04 | 2.04E−05 | 6.38E−06 | 3.47E−07 | 3.99E−09 | −1.66E−11 | −1.59E−11 |
| 26th order term | 7.31E−05 | −1.10E−05 | −1.56E−06 | −3.89E−07 | −1.50E−08 | −1.49E−10 | 2.85E−13 | 2.90E−13 |
| 28th order term | −4.94E−06 | 6.59E−07 | 7.05E−08 | 1.40E−08 | 3.80E−10 | 3.06E−12 | −2.93E−15 | −3.21E−15 |
| 30th order term | 1.48E−07 | −1.76E−08 | −1.43E−09 | −2.25E−10 | −4.31E−12 | −2.60E−14 | 1.37E−17 | 1.64E−17 |

Figure 3:
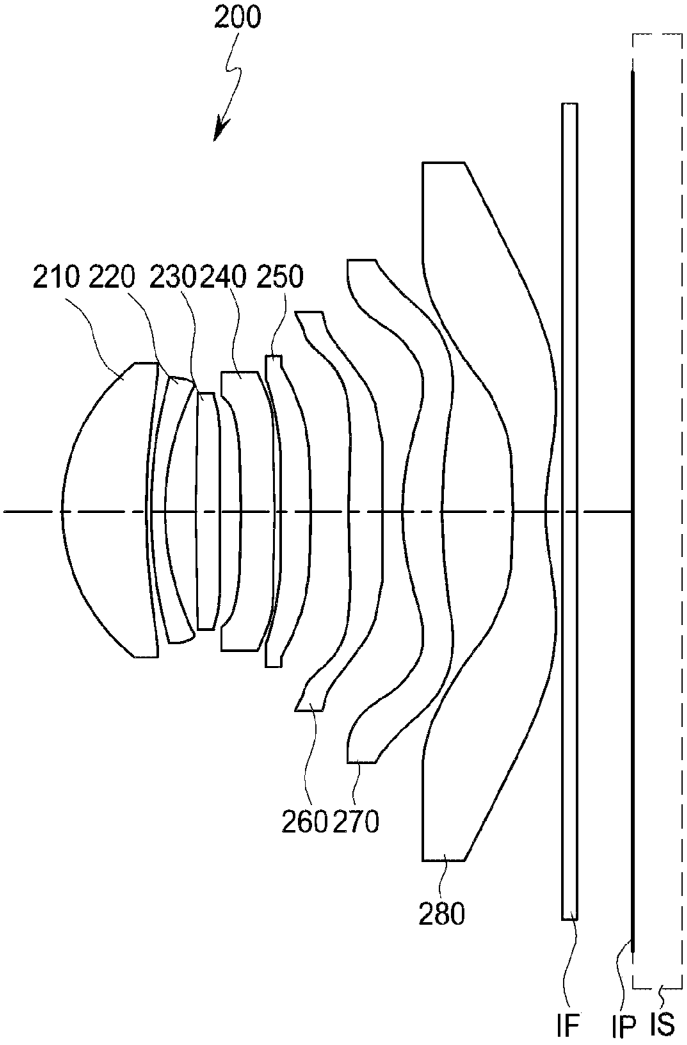
FIG. 3 is a diagram illustrating an imaging lens system according to a second embodiment of the present disclosure.

An imaging lens system according to a second embodiment will be described with reference to FIG. 3.

The imaging lens system 200 may include a first lens 210, a second lens 220, a third lens 230, a fourth lens 240, a fifth lens 250, a sixth lens 260, a seventh lens 270, and an eighth lens 280.

The first lens 210 may have positive refractive power, and may have a convex object-side surface and a concave image-side surface. The second lens 220 may have negative refractive power, and may have a convex object-side surface and a concave image-side surface. The third lens 230 may have positive refractive power, and may have a convex object-side surface and a concave image-side surface. The fourth lens 240 may have negative refractive power, and may have a concave object-side surface and a concave image-side surface. The fifth lens 250 may have positive refractive power, and may have a convex object-side surface and a convex image-side surface. The sixth lens 260 may have negative refractive power, and may have a convex object-side surface and a concave image-side surface. Also, an inflection point may be formed on an object-side surface and an image-side surface of the sixth lens 260. The seventh lens 270 may have positive refractive power, and may have a convex object-side surface and a concave image-side surface. Also, an inflection point may be formed on an object-side surface and an image-side surface of the seventh lens 270. The eighth lens 280 may have negative refractive power, and may have a convex object-side surface and a concave image-side surface. Also, an inflection point may be formed on an object-side surface and an image-side surface of the eighth lens 280.

The imaging lens system 200 may further include a filter IF and an imaging plane IP. The filter IF may be disposed between the eighth lens 280 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 4:
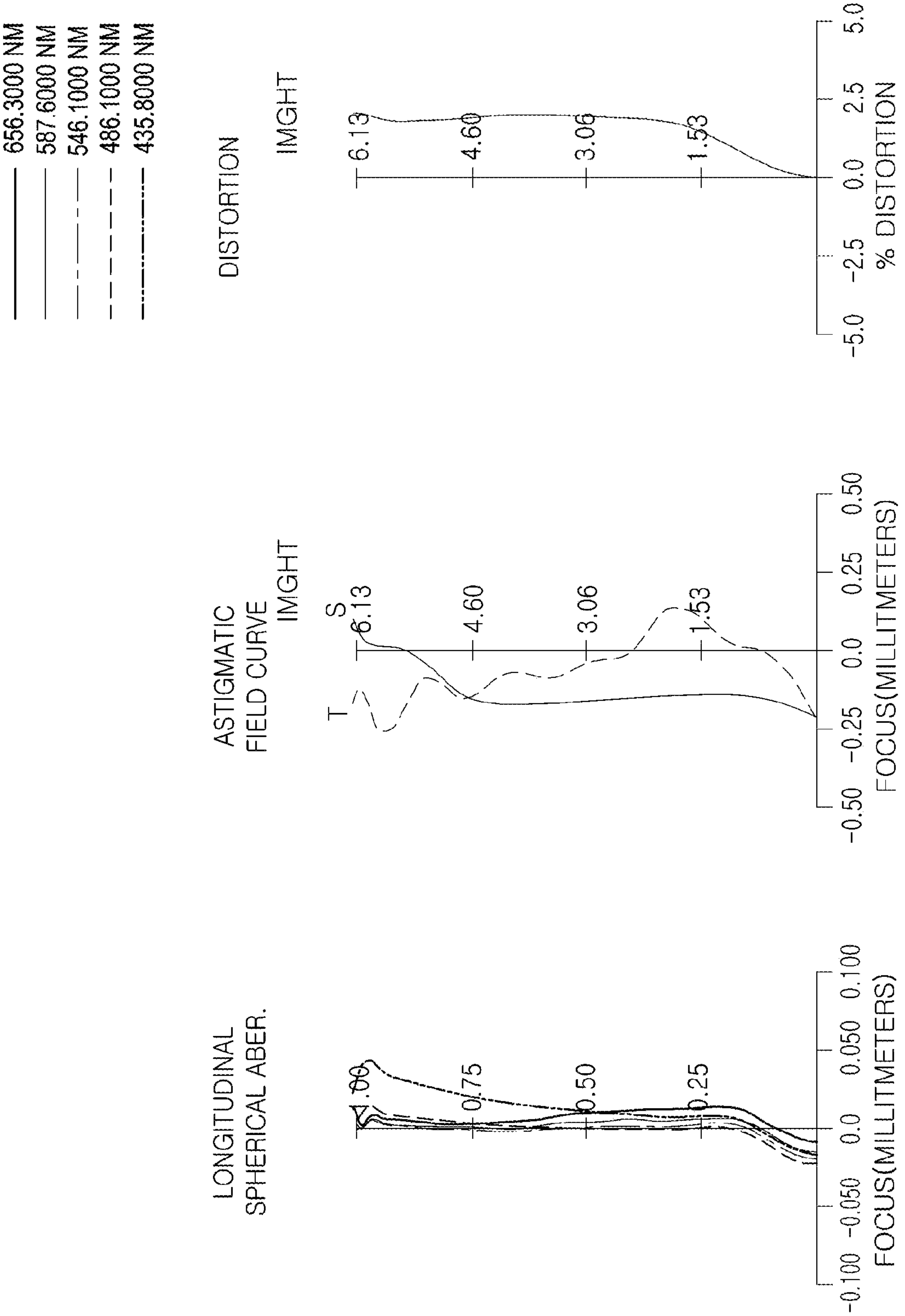
FIG. 4 is aberration curves of the imaging lens system illustrated in FIG. 3.

Tables 3 and 4 list the lens characteristics and the aspheric value of the imaging lens system according to the present embodiment. FIG. 4 is aberration curves of the imaging lens system according to the present embodiment.

TABLE 3

| Surface No. | Components | Radius of curvature | Thickness/ Distance | Refractive index | Abbe number | Effective Radius |
|---|---|---|---|---|---|---|
| S1 | First lens | 2.739 | 1.191 | 1.546 | 55.990 | 2.109 |
| S2 | | 14.367 | 0.050 | | | 1.969 |
| S3 | Second lens | 9.100 | 0.210 | 1.679 | 19.238 | 1.898 |
| S4 | Stop | 4.651 | 0.436 | | | 1.746 |
| S5 | Third lens | 15.731 | 0.341 | 1.546 | 55.990 | 1.716 |
| S6 | | 31.081 | 0.291 | | | 1.644 |
| S7 | Fourth lens | −325.319 | 0.457 | 1.679 | 19.238 | 1.673 |
| S8 | | 23.609 | 0.100 | | | 2.009 |
| S9 | Fifth lens | 33.554 | 0.409 | 1.546 | 55.990 | 2.124 |
| S10 | | −850.402 | 0.554 | | | 2.227 |
| S11 | Sixth lens | 26.446 | 0.472 | 1.571 | 37.403 | 2.630 |
| S12 | | 24.603 | 0.262 | | | 2.854 |
| S13 | Seventh lens | 3.144 | 0.549 | 1.546 | 55.990 | 3.360 |
| S14 | | 15.584 | 1.006 | | | 3.620 |
| S15 | Eighth lens | 29.575 | 0.430 | 1.537 | 55.735 | 4.634 |
| S16 | | 2.491 | 0.242 | | | 5.021 |
| S17 | Filter | infinity | 0.210 | 1.519 | 64.197 | 5.798 |
| S18 | | infinity | 0.770 | | | 5.871 |
| S19 | Imaging plane | infinity | 0.020 | | | 6.131 |

TABLE 4

| Surface No. | S1 | S2 | S3 | S4 | S5 | S6 | S7 | S8 |
|---|---|---|---|---|---|---|---|---|
| K | −3.88E−01 | 2.05E+01 | −7.50E+00 | −2.98E+00 | −1.06E+00 | 9.88E+01 | 0.00E+00 | 0.00E+00 |
| 4th order term | 2.28E−03 | 5.66E−03 | 2.36E−03 | 2.95E−03 | −9.73E−03 | −7.95E−03 | −1.16E−02 | −2.98E−03 |
| 6th order term | 4.03E−03 | −2.17E−02 | −2.35E−02 | −1.97E−02 | −4.18E−03 | −3.46E−02 | −7.59E−03 | −4.38E−02 |
| 8th order term | −1.23E−02 | 5.44E−02 | 6.87E−02 | 7.38E−02 | 1.31E−02 | 1.46E−01 | 1.10E−02 | 1.24E−01 |
| 10th order term | 2.58E−02 | −9.39E−02 | −1.31E−01 | −1.64E−01 | −6.54E−02 | −4.40E−01 | −7.01E−02 | −2.40E−01 |
| 12th order term | −3.53E−02 | 1.12E−01 | 1.77E−01 | 2.41E−01 | 1.95E−01 | 8.95E−01 | 2.33E−01 | 3.23E−01 |
| 14th order term | 3.28E−02 | −9.20E−02 | −1.68E−01 | −2.33E−01 | −3.68E−01 | −1.27E+00 | −4.70E−01 | −3.11E−01 |
| 16th order term | −2.15E−02 | 5.27E−02 | 1.14E−01 | 1.46E−01 | 4.64E−01 | 1.30E+00 | 6.19E−01 | 2.19E−01 |
| 18th order term | 1.01E−02 | −2.08E−02 | −5.59E−02 | −5.23E−02 | −4.05E−01 | −9.61E−01 | −5.59E−01 | −1.13E−01 |
| 20th order term | −3.42E−03 | 5.50E−03 | 1.97E−02 | 4.18E−03 | 2.48E−01 | 5.17E−01 | 3.52E−01 | 4.26E−02 |
| 22nd order term | 8.23E−04 | −8.74E−04 | −4.93E−03 | 5.69E−03 | −1.06E−01 | −2.00E−01 | −1.55E−01 | −1.17E−02 |
| 24th order term | −1.38E−04 | 5.33E−05 | 8.48E−04 | −3.06E−03 | 3.13E−02 | 5.44E−02 | 4.70E−02 | 2.24E−03 |
| 26th order term | 1.53E−05 | 6.94E−06 | −9.49E−05 | 7.52E−04 | −6.02E−03 | −9.84E−03 | −9.29E−03 | −2.86E−04 |
| 28th order term | −1.00E−06 | −1.51E−06 | 6.14E−06 | −9.57E−05 | 6.82E−04 | 1.06E−03 | 1.08E−03 | 2.19E−05 |
| 30th order term | 2.96E−08 | 8.36E−08 | −1.71E−07 | 5.08E−06 | −3.45E−05 | −5.19E−05 | −5.66E−05 | −7.52E−07 |

| Surface No. | S9 | S10 | S11 | S12 | S13 | S14 | S15 | S16 |
|---|---|---|---|---|---|---|---|---|
| K | 9.90E+01 | 9.90E+01 | 0.00E+00 | −9.90E+01 | −1.14E+01 | 5.22E+00 | 3.42E+01 | −6.51E+00 |
| 4th order term | −2.32E−02 | −2.13E−02 | 1.87E−03 | −1.52E−02 | 6.49E−02 | 5.90E−02 | −9.39E−02 | −6.37E−02 |
| 6th order term | −1.76E−02 | −1.58E−02 | −3.28E−02 | −6.58E−02 | −8.03E−02 | −3.31E−02 | 3.08E−02 | 2.49E−02 |

TABLE 4-continued

| | | | | | | | | |
|---|---|---|---|---|---|---|---|---|
| 8th order term | 2.47E−02 | 2.88E−02 | 5.74E−02 | 9.99E−02 | 6.13E−02 | 7.45E−03 | −9.71E−03 | −8.23E−03 |
| 10th order term | 6.92E−04 | −4.04E−02 | −6.58E−02 | −8.95E−02 | −3.74E−02 | −6.63E−04 | 2.68E−03 | 2.09E−03 |
| 12th order term | −4.83E−02 | 4.25E−02 | 5.29E−02 | 5.69E−02 | 1.72E−02 | 5.16E−06 | −5.40E−04 | −3.90E−04 |
| 14th order term | 7.84E−02 | −3.32E−02 | −3.13E−02 | −2.68E−02 | −5.84E−03 | −4.52E−05 | 7.83E−05 | 5.34E−05 |
| 16th order term | −6.96E−02 | 1.93E−02 | 1.37E−02 | 9.39E−03 | 1.44E−03 | 2.56E−05 | −8.30E−06 | −5.36E−06 |
| 18th order term | 4.01E−02 | −8.30E−03 | −4.43E−03 | −2.43E−03 | −2.59E−04 | −6.37E−06 | 6.54E−07 | 3.96E−07 |
| 20th order term | −1.57E−02 | 2.62E−03 | 1.05E−03 | 4.60E−04 | 3.36E−05 | 9.37E−07 | −3.83E−08 | −2.14E−08 |
| 22nd order term | 4.21E−03 | −5.95E−04 | −1.77E−04 | −6.25E−05 | −3.10E−06 | −8.79E−08 | 1.66E−09 | 8.35E−10 |
| 24th order term | −7.67E−04 | 9.42E−05 | 2.09E−05 | 5.89E−06 | 1.98E−07 | 5.33E−09 | −5.12E−11 | −2.30E−11 |
| 26th order term | 9.04E−05 | −9.81E−06 | −1.63E−06 | −3.65E−07 | −8.29E−09 | −2.01E−10 | 1.07E−12 | 4.21E−13 |
| 28th order term | −6.22E−06 | 6.01E−07 | 7.50E−08 | 1.34E−08 | 2.04E−10 | 4.28E−12 | −1.36E−14 | −4.64E−15 |
| 30th order term | 1.90E−07 | −1.63E−08 | −1.54E−09 | −2.19E−10 | −2.25E−12 | −3.88E−14 | 7.94E−17 | 2.32E−17 |

Figure 5:
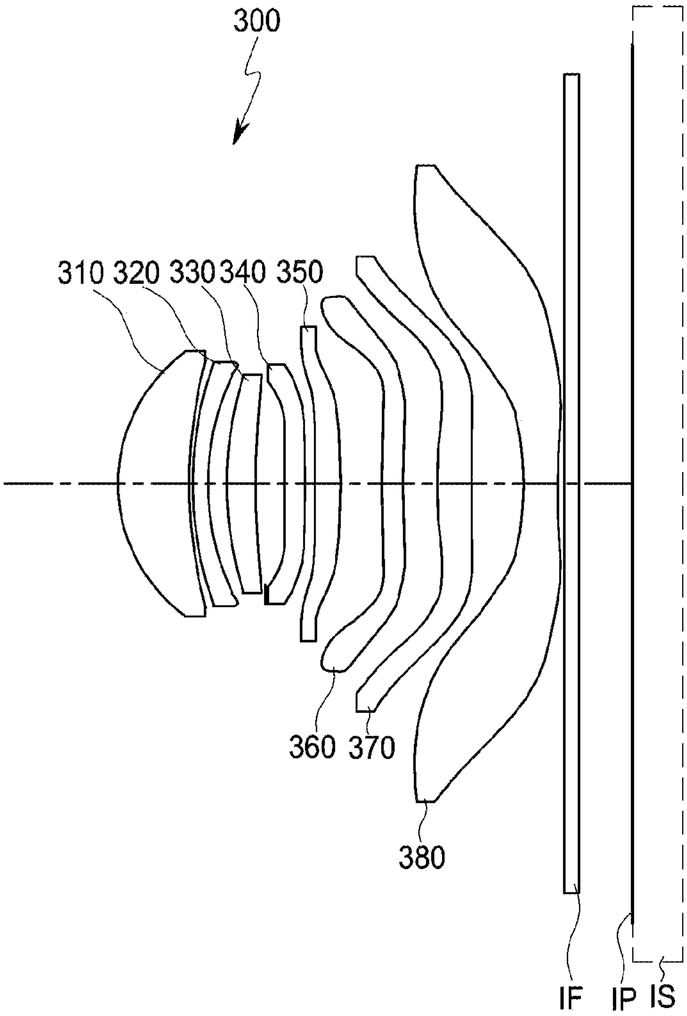
FIG. 5 is a diagram illustrating an imaging lens system according to a third embodiment of the present disclosure.

An imaging lens system according to a third embodiment will be described with reference to FIG. 5.

The imaging lens system 300 may include a first lens 310, a second lens 320, a third lens 330, a fourth lens 340, a fifth lens 350, a sixth lens 360, a seventh lens 370, and an eighth lens 380.

The first lens 310 may have positive refractive power, and may have a convex object-side surface and a concave image-side surface. The second lens 320 may have negative refractive power and may have a convex object-side surface and a concave image-side surface. The third lens 330 may have positive refractive power, and may have a convex object-side surface and a concave image-side surface. The fourth lens 340 may have negative refractive power, and may have a convex object-side surface and a concave image-side surface. The fifth lens 350 may have positive refractive power and may have a convex object-side surface and a convex image-side surface. The sixth lens 360 may have positive refractive power, and may have a convex object-side surface and a concave image-side surface. Also, an inflection point may be formed on an object-side surface and an image-side surface of the sixth lens 360. The seventh lens 370 may have positive refractive power, and may have a convex object-side surface and a concave image-side surface. Also, an inflection point may be formed on an object-side surface and an image-side surface of the seventh lens 370. The eighth lens 380 may have negative refractive power, and may have a concave object-side surface and a concave image-side surface. Also, an inflection point may be formed on an object-side surface and an image-side surface of the eighth lens 380.

The imaging lens system 300 may further include a filter IF and an imaging plane IP. The filter IF may be disposed between the eighth lens 380 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 6:
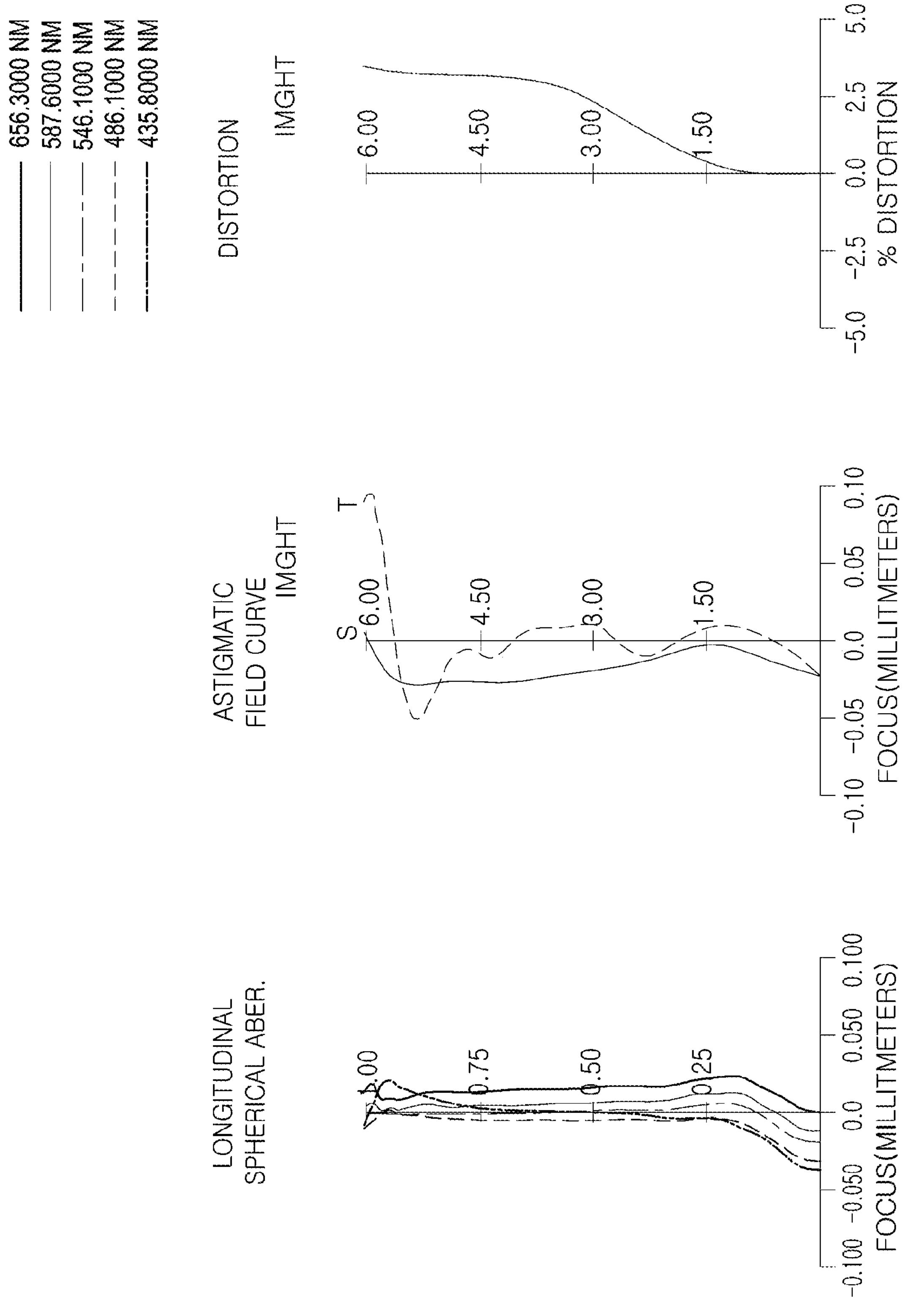
FIG. 6 is aberration curves of the imaging lens system illustrated in FIG. 5.

Tables 5 and 6 list lens characteristics and aspheric values of the imaging lens system according to the present embodiment. FIG. 6 is aberration curves of the imaging lens system according to the present embodiment.

TABLE 5

| Surface No. | Components | Radius of curvature | Thickness/ Distance | Refractive index | Abbe number | Effective Radius |
|---|---|---|---|---|---|---|
| S1 | First lens | 2.374 | 0.975 | 1.546 | 55.990 | 1.900 |
| S2 | | 6.928 | 0.070 | | | 1.793 |
| S3 | Second lens | 6.570 | 0.200 | 1.689 | 18.152 | 1.751 |
| S4 | Stop | 4.050 | 0.276 | | | 1.619 |
| S5 | Third lens | 6.002 | 0.406 | 1.546 | 55.990 | 1.570 |
| S6 | | 10.770 | 0.412 | | | 1.454 |
| S7 | Fourth lens | 145.752 | 0.257 | 1.689 | 18.152 | 1.468 |
| S8 | | 20.114 | 0.162 | | | 1.707 |
| S9 | Fifth lens | 53.454 | 0.356 | 1.571 | 37.403 | 2.081 |
| S10 | | −26.680 | 0.558 | | | 2.266 |
| S11 | Sixth lens | 7.240 | 0.300 | 1.571 | 37.403 | 2.491 |
| S12 | | 7.572 | 0.461 | | | 2.770 |
| S13 | Seventh lens | 3.449 | 0.496 | 1.571 | 37.403 | 3.023 |
| S14 | | 6.527 | 0.750 | | | 3.291 |
| S15 | Eighth lens | −192.161 | 0.430 | 1.537 | 55.735 | 4.374 |
| S16 | | 2.627 | 0.122 | | | 4.594 |
| S17 | Filter | infinity | 0.110 | 1.519 | 64.197 | 5.810 |
| S18 | | infinity | 0.730 | | | 5.853 |
| S19 | Imaging plane | infinity | 0.020 | | | 6.000 |

TABLE 6

| Surface No. | S1 | S2 | S3 | S4 | S5 | S6 | S7 | S8 |
|---|---|---|---|---|---|---|---|---|
| K | −4.35E−01 | 7.97E+00 | −5.26E+00 | −2.91E+00 | 1.30E+01 | 4.68E+01 | 0.00E+00 | 0.00E+00 |
| 4th order term | 2.00E−03 | −2.24E−02 | −4.49E−02 | −2.69E−02 | −2.18E−02 | −5.20E−03 | −2.48E−02 | −3.38E−02 |
| 6th order term | 1.16E−02 | 4.16E−04 | 5.80E−02 | 2.79E−02 | −3.53E−02 | −9.40E−02 | −9.17E−02 | 1.91E−02 |
| 8th order term | −3.18E−02 | 9.39E−02 | −4.51E−02 | 2.14E−02 | 3.52E−01 | 5.77E−01 | 4.50E−01 | −1.22E−01 |
| 10th order term | 6.15E−02 | −2.69E−01 | 7.99E−02 | −5.95E−02 | −1.68E+00 | −2.33E+00 | −1.57E+00 | 3.97E−01 |
| 12th order term | −8.30E−02 | 4.63E−01 | −2.05E−01 | −2.53E−02 | 4.88E+00 | 6.36E+00 | 3.73E+00 | −8.57E−01 |
| 14th order term | 8.11E−02 | −5.60E−01 | 3.53E−01 | 2.59E−01 | −9.39E+00 | −1.21E+01 | −6.23E+00 | 1.28E+00 |
| 16th order term | −5.82E−02 | 4.93E−01 | −4.00E−01 | −4.75E−01 | 1.25E+01 | 1.64E+01 | 7.48E+00 | −1.37E+00 |
| 18th order term | 3.08E−02 | −3.19E−01 | 3.12E−01 | 4.92E−01 | −1.18E+01 | −1.61E+01 | −6.53E+00 | 1.05E+00 |
| 20th order term | −1.19E−02 | 1.50E−01 | −1.72E−01 | −3.31E−01 | 7.97E+00 | 1.14E+01 | 4.16E+00 | −5.84E−01 |
| 22nd order term | 3.32E−03 | −5.10E−02 | 6.64E−02 | 1.49E−01 | −3.82E+00 | −5.80E+00 | −1.91E+00 | 2.31E−01 |
| 24th order term | −6.45E−04 | 1.21E−02 | −1.77E−02 | −4.47E−02 | 1.27E+00 | 2.06E+00 | 6.19E−01 | −6.36E−02 |
| 26th order term | 8.26E−05 | −1.92E−03 | 3.09E−03 | 8.55E−03 | −2.78E−01 | −4.87E−01 | −1.34E−01 | 1.15E−02 |
| 28th order term | −6.24E−06 | 1.81E−04 | −3.19E−04 | −9.37E−04 | 3.62E−02 | 6.86E−02 | 1.75E−02 | −1.23E−03 |
| 30th order term | 2.10E−07 | −7.72E−06 | 1.46E−05 | 4.46E−05 | −2.12E−03 | −4.36E−03 | −1.05E−03 | 5.91E−05 |

| Surface No. | S9 | S10 | S11 | S12 | S13 | S14 | S15 | S16 |
|---|---|---|---|---|---|---|---|---|
| K | 9.90E+01 | −8.02E+01 | 0.00E+00 | −2.08E+01 | −2.49E+01 | −7.23E+01 | 9.90E+01 | −1.73E+01 |
| 4th order term | −3.13E−02 | −3.37E−02 | −4.31E−02 | −7.30E−02 | −6.35E−03 | −2.66E−02 | −2.12E−01 | −1.10E−01 |
| 6th order term | 1.32E−02 | −9.32E−03 | 4.85E−02 | 9.66E−02 | −2.33E−02 | 7.01E−03 | 1.43E−01 | 7.10E−02 |
| 8th order term | −3.51E−02 | 6.18E−02 | −7.34E−02 | −1.24E−01 | 3.10E−02 | 4.08E−03 | −6.56E−02 | −3.11E−02 |
| 10th order term | 8.31E−02 | −1.59E−01 | 8.05E−02 | 1.18E−01 | −3.09E−02 | −1.19E−02 | 2.02E−02 | 9.53E−03 |
| 12th order term | −1.29E−01 | 2.44E−01 | −7.02E−02 | −8.32E−02 | 1.91E−02 | 9.20E−03 | −4.24E−03 | −2.09E−03 |
| 14th order term | 1.36E−01 | −2.43E−01 | 4.74E−02 | 4.28E−02 | −7.72E−03 | −4.09E−03 | 6.28E−04 | 3.33E−04 |
| 16th order term | −1.02E−01 | 1.64E−01 | −2.42E−02 | −1.61E−02 | 2.10E−03 | 1.21E−03 | −6.76E−05 | −3.94E−05 |
| 18th order term | 5.58E−02 | −7.73E−02 | 9.25E−03 | 4.37E−03 | −3.91E−04 | −2.51E−04 | 5.36E−06 | 3.47E−06 |
| 20th order term | −2.18E−02 | 2.57E−02 | −2.58E−03 | −8.57E−04 | 4.96E−05 | 3.68E−05 | −3.13E−07 | −2.28E−07 |
| 22nd order term | 6.00E−03 | −5.97E−03 | 5.15E−04 | 1.19E−04 | −4.19E−06 | −3.82E−06 | 1.34E−08 | 1.09E−08 |
| 24th order term | −1.13E−03 | 9.50E−04 | −7.11E−05 | −1.14E−05 | 2.22E−07 | 2.74E−07 | −4.07E−10 | −3.73E−10 |
| 26th order term | 1.37E−04 | −9.85E−05 | 6.40E−06 | 7.11E−07 | −6.46E−09 | −1.30E−08 | 8.36E−12 | 8.57E−12 |
| 28th order term | −9.66E−06 | 6.00E−06 | −3.37E−07 | −2.62E−08 | 6.12E−11 | 3.62E−10 | −1.04E−13 | −1.18E−13 |
| 30th order term | 3.02E−07 | −1.62E−07 | 7.86E−09 | 4.29E−10 | 7.71E−13 | −4.55E−12 | 5.97E−16 | 7.39E−16 |

Figure 7:
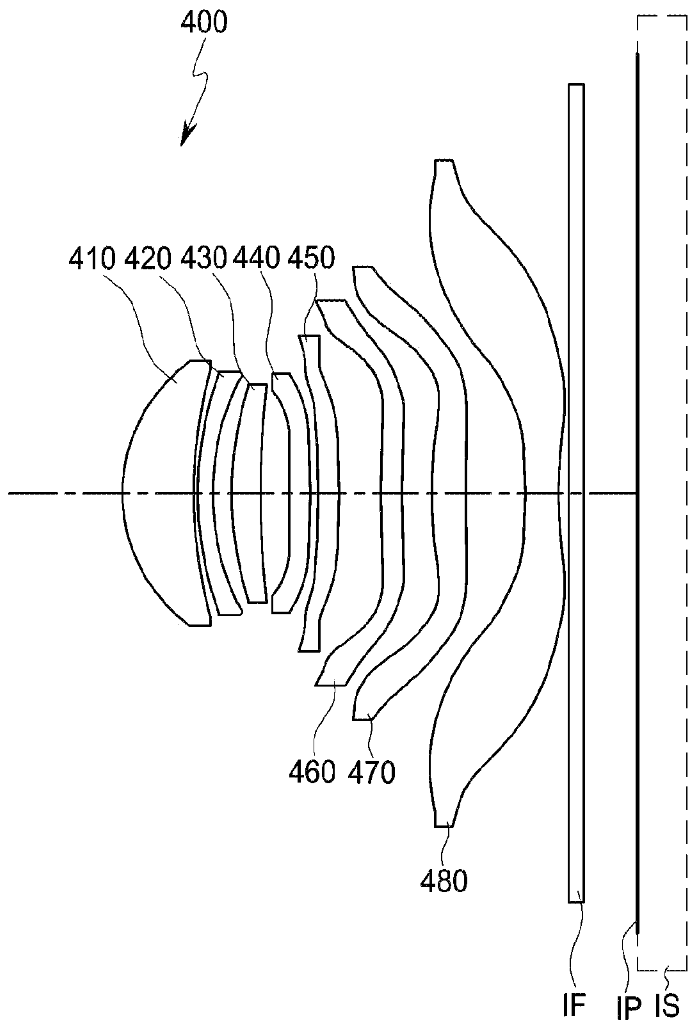
FIG. 7 is a diagram illustrating an imaging lens system according to a fourth embodiment of the present disclosure.

An imaging lens system according to a fourth embodiment will be described with reference to FIG. 7.

The imaging lens system 400 may include a first lens 410, a second lens 420, a third lens 430, a fourth lens 440, a fifth lens 450, a sixth lens 460, a seventh lens 470, and an eighth lens 480.

The first lens 410 may have positive refractive power, and may have a convex object-side surface and a concave image-side surface. The second lens 420 may have negative refractive power, and may have a convex object-side surface and a concave image-side surface. The third lens 430 may have positive refractive power, and may have a convex object-side surface and a concave image-side surface. The fourth lens 440 may have negative refractive power, and may have a convex object-side surface and a concave image-side surface. The fifth lens 450 may have positive refractive power, and may have a convex object-side surface and a convex image-side surface. The sixth lens 460 may have negative refractive power, and may have a convex object-side surface and a concave image-side surface. Also, an inflection point may be formed on an object-side surface and an image-side surface of the sixth lens 460. The seventh lens 470 may have positive refractive power, and may have a convex object-side surface and a concave image-side surface. Also, an inflection point may be formed on an object-side surface and an image-side surface of the seventh lens 470. The eighth lens 480 may have negative refractive power, and may have a concave object-side surface and a concave image-side surface. Also, an inflection point may be formed on an object-side surface and an image-side surface of the eighth lens 480.

The imaging lens system 400 may further include a filter IF and an imaging plane IP. The filter IF may be disposed between the eighth lens 480 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 8:
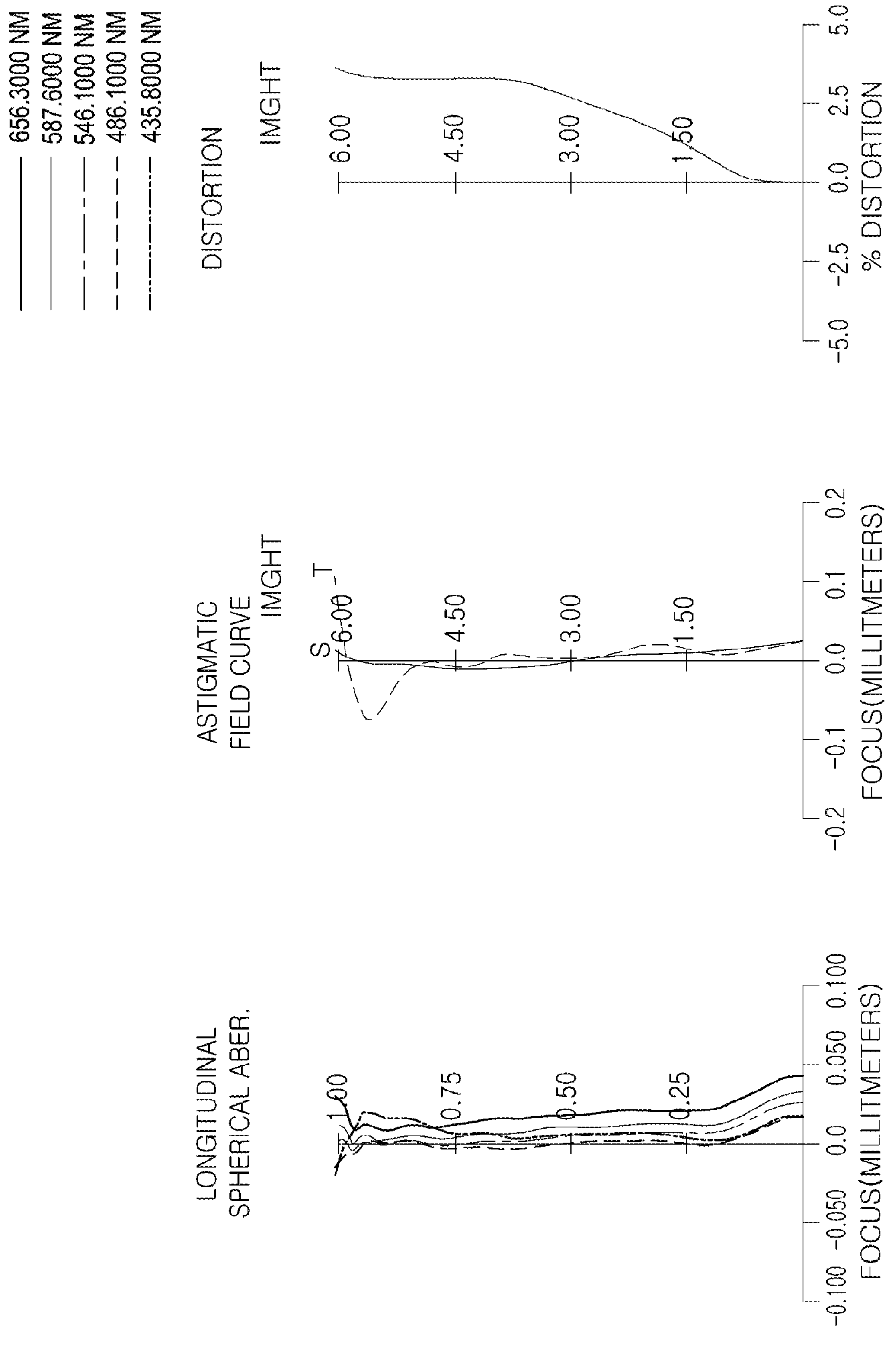
FIG. 8 is aberration curves of the imaging lens system illustrated in FIG. 7.

Tables 7 and 8 list lens characteristics and aspheric values of the imaging lens system according to the present embodiment. FIG. 8 is aberration curves of the imaging lens system according to the present embodiment.

TABLE 7

| Surface No. | Components | Radius of curvature | Thickness/ Distance | Refractive index | Abbe number | Effective Radius |
|---|---|---|---|---|---|---|
| S1 | First lens | 2.382 | 1.000 | 1.546 | 55.990 | 1.903 |
| S2 | | 7.764 | 0.070 | | | 1.794 |
| S3 | Second lens | 6.424 | 0.200 | 1.689 | 18.152 | 1.739 |
| S4 | Stop | 3.821 | 0.281 | | | 1.607 |
| S5 | Third lens | 6.228 | 0.400 | 1.546 | 55.990 | 1.566 |
| S6 | | 10.898 | 0.389 | | | 1.451 |
| S7 | Fourth lens | 75.355 | 0.277 | 1.689 | 18.152 | 1.476 |
| S8 | | 18.856 | 0.135 | | | 1.713 |
| S9 | Fifth lens | 29.921 | 0.292 | 1.571 | 37.403 | 2.061 |
| S10 | | −57.905 | 0.572 | | | 2.247 |
| S11 | Sixth lens | 7.283 | 0.300 | 1.620 | 25.936 | 2.454 |
| S12 | | 6.278 | 0.401 | | | 2.741 |
| S13 | Seventh lens | 3.840 | 0.487 | 1.571 | 37.403 | 3.021 |
| S14 | | 13.429 | 0.838 | | | 3.241 |
| S15 | Eighth lens | −175.058 | 0.430 | 1.537 | 55.735 | 4.614 |
| S16 | | 2.622 | 0.157 | | | 4.769 |
| S17 | Filter | infinity | 0.210 | 1.519 | 64.197 | 5.514 |
| S18 | | infinity | 0.675 | | | 5.594 |
| S19 | Imaging plane | infinity | −0.025 | | | 6.008 |

TABLE 8

| Surface No. | S1 | S2 | S3 | S4 | S5 | S6 | S7 | S8 |
|---|---|---|---|---|---|---|---|---|
| K | −4.68E−01 | 8.32E+00 | −6.14E+00 | −2.73E+00 | 1.30E+01 | 4.68E+01 | 0.00E+00 | 0.00E+00 |
| 4th order term | 4.42E−03 | −3.35E−02 | −4.75E−02 | −2.72E−02 | −2.17E−02 | −1.97E−02 | −2.53E−02 | −3.57E−02 |
| 6th order term | 3.59E−03 | 9.63E−02 | 9.85E−02 | 4.59E−02 | 1.97E−02 | 6.49E−02 | −6.85E−02 | 9.34E−03 |
| 8th order term | −1.48E−02 | −2.39E−01 | −1.51E−01 | 8.78E−03 | −7.06E−02 | −3.96E−01 | 4.96E−01 | 3.04E−02 |
| 10th order term | 3.58E−02 | 4.86E−01 | 2.24E−01 | −2.47E−01 | 1.83E−01 | 1.51E+00 | −2.23E+00 | −2.04E−01 |
| 12th order term | −5.24E−02 | −7.45E−01 | −3.09E−01 | 7.78E−01 | −3.29E−01 | −3.90E+00 | 6.35E+00 | 4.98E−01 |
| 14th order term | 5.15E−02 | 8.35E−01 | 3.64E−01 | −1.45E+00 | 4.05E−01 | 7.01E+00 | −1.23E+01 | −7.35E−01 |
| 16th order term | −3.56E−02 | −6.84E−01 | −3.42E−01 | 1.83E+00 | −3.37E−01 | −8.94E+00 | 1.67E+01 | 7.27E−01 |
| 18th order term | 1.77E−02 | 4.11E−01 | 2.45E−01 | −1.63E+00 | 1.79E−01 | 8.20E+00 | −1.62E+01 | −5.03E−01 |
| 20th order term | −6.39E−03 | −1.80E−01 | −1.31E−01 | 1.03E+00 | −4.53E−02 | −5.39E+00 | 1.14E+01 | 2.47E−01 |
| 22nd order term | 1.66E−03 | 5.69E−02 | 5.02E−02 | −4.65E−01 | −9.54E−03 | 2.52E+00 | −5.67E+00 | −8.61E−02 |
| 24th order term | −3.02E−04 | −1.26E−02 | −1.34E−02 | 1.45E−01 | 1.28E−02 | −8.08E−01 | 1.96E+00 | 2.08E−02 |
| 26th order term | 3.64E−05 | 1.84E−03 | 2.37E−03 | −2.99E−02 | −4.83E−03 | 1.69E−01 | −4.50E−01 | −3.33E−03 |
| 28th order term | −2.61E−06 | −1.61E−04 | −2.47E−04 | 3.66E−03 | 8.91E−04 | −2.06E−02 | 6.10E−02 | 3.17E−04 |
| 30th order term | 8.38E−08 | 6.33E−06 | 1.15E−05 | −2.01E−04 | −6.77E−05 | 1.10E−03 | −3.72E−03 | −1.37E−05 |

| Surface No. | S9 | S10 | S11 | S12 | S13 | S14 | S15 | S16 |
|---|---|---|---|---|---|---|---|---|
| K | −9.65E+01 | −9.90E+01 | 0.00E+00 | −3.25E+01 | −2.08E+01 | −1.84E+01 | −9.90E+01 | −1.85E+01 |
| 4th order term | −4.79E−02 | −4.46E−02 | −7.91E−02 | −1.02E−01 | −2.67E−02 | −2.18E−02 | −1.50E−01 | −5.86E−02 |
| 6th order term | 2.99E−02 | 1.66E−02 | 1.11E−01 | 1.36E−01 | 1.65E−02 | 1.27E−02 | 9.13E−02 | 2.88E−02 |

TABLE 8-continued

| | | | | | | | | |
|---|---|---|---|---|---|---|---|---|
| 8th order term | −2.87E−02 | 4.78E−03 | −1.63E−01 | −1.64E−01 | −1.35E−02 | −4.61E−03 | −4.18E−02 | −1.08E−02 |
| 10th order term | 1.15E−03 | −6.22E−02 | 1.88E−01 | 1.54E−01 | 4.90E−03 | −3.76E−03 | 1.30E−02 | 2.69E−03 |
| 12th order term | 3.04E−02 | 1.20E−01 | −1.65E−01 | −1.11E−01 | −1.16E−03 | 3.97E−03 | −2.72E−03 | −4.50E−04 |
| 14th order term | −3.28E−02 | −1.30E−01 | 1.05E−01 | 5.84E−02 | 2.25E−04 | −1.75E−03 | 3.97E−04 | 5.21E−05 |
| 16th order term | 1.06E−02 | 9.14E−02 | −4.79E−02 | −2.24E−02 | −5.00E−05 | 4.59E−04 | −4.17E−05 | −4.34E−06 |
| 18th order term | 5.96E−03 | −4.41E−02 | 1.56E−02 | 6.22E−03 | 9.65E−06 | −7.66E−05 | 3.20E−06 | 2.72E−07 |
| 20th order term | −7.27E−03 | 1.49E−02 | −3.57E−03 | −1.24E−03 | −7.13E−07 | 7.96E−06 | −1.80E−07 | −1.34E−08 |
| 22nd order term | 3.28E−03 | −3.54E−03 | 5.65E−04 | 1.75E−04 | −1.29E−07 | −4.50E−07 | 7.41E−09 | 5.33E−10 |
| 24th order term | −8.32E−04 | 5.74E−04 | −5.93E−05 | −1.71E−05 | 3.58E−08 | 3.86E−09 | −2.16E−10 | −1.68E−11 |
| 26th order term | 1.25E−04 | −6.08E−05 | 3.82E−06 | 1.09E−06 | −3.55E−09 | 1.18E−09 | 4.23E−12 | 3.86E−13 |
| 28th order term | −1.03E−05 | 3.79E−06 | −1.30E−07 | −4.10E−08 | 1.68E−10 | −7.08E−11 | −5.00E−14 | −5.50E−15 |
| 30th order term | 3.66E−07 | −1.05E−07 | 1.51E−09 | 6.88E−10 | −3.15E−12 | 1.35E−12 | 2.70E−16 | 3.58E−17 |

Figure 9:
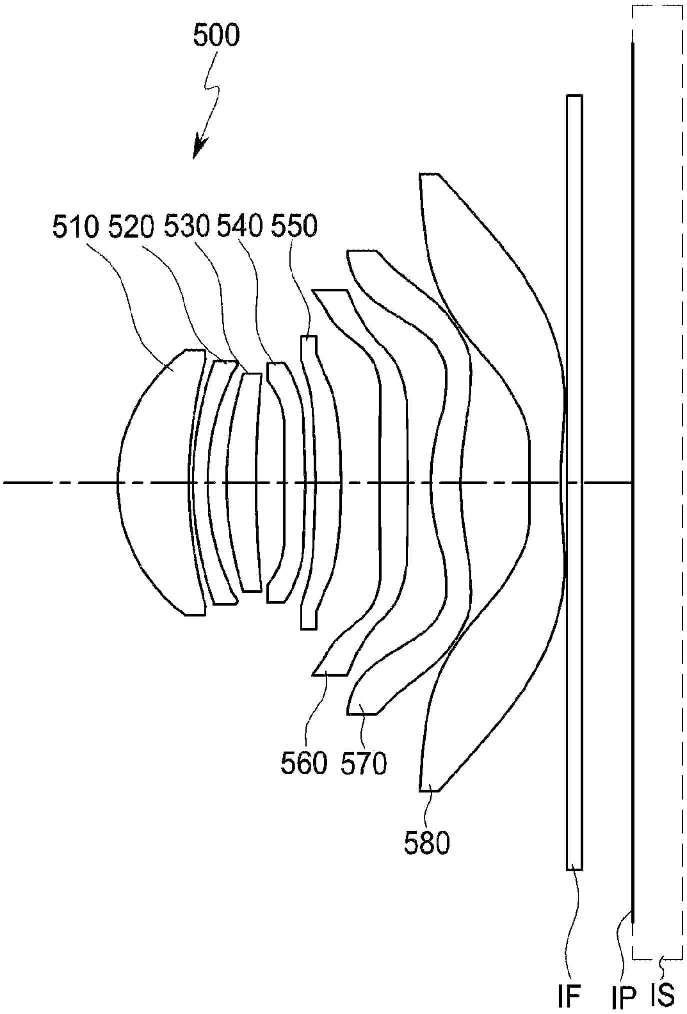
FIG. 9 is a diagram illustrating an imaging lens system according to a fifth embodiment of the present disclosure.

An imaging lens system according to a fifth embodiment will be described with reference to FIG. 9.

The imaging lens system 500 may include a first lens 510, a second lens 520, a third lens 530, a fourth lens 540, a fifth lens 550, a sixth lens 560, a seventh lens 570, and an eighth lens 580.

The first lens 510 may have positive refractive power, and may have a convex object-side surface and a concave image-side surface. The second lens 520 may have negative refractive power, and may have a convex object-side surface and a concave image-side surface. The third lens 530 may have positive refractive power, and may have a convex object-side surface and a concave image-side surface. The fourth lens 540 may have negative refractive power, and may have a convex object-side surface and a concave image-side surface. The fifth lens 550 may have positive refractive power, and may have a convex object-side surface and a convex image-side surface. The sixth lens 560 may have positive refractive power, and may have a convex object-side surface and a concave image-side surface. Also, an inflection point may be formed on an object-side surface and an image-side surface of the sixth lens 560. The seventh lens 570 may have positive refractive power, and may have a convex object-side surface and a concave image-side surface. Also, an inflection point may be formed on an object-side surface and an image-side surface of the seventh lens 570. The eighth lens 580 may have negative refractive power, and may have a convex object-side surface and a concave image-side surface. Also, an inflection point may be formed on an object-side surface and an image-side surface of the eighth lens 580.

The imaging lens system 500 may further include a filter IF and an imaging plane IP. The filter IF may be disposed between the eighth lens 580 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 10:
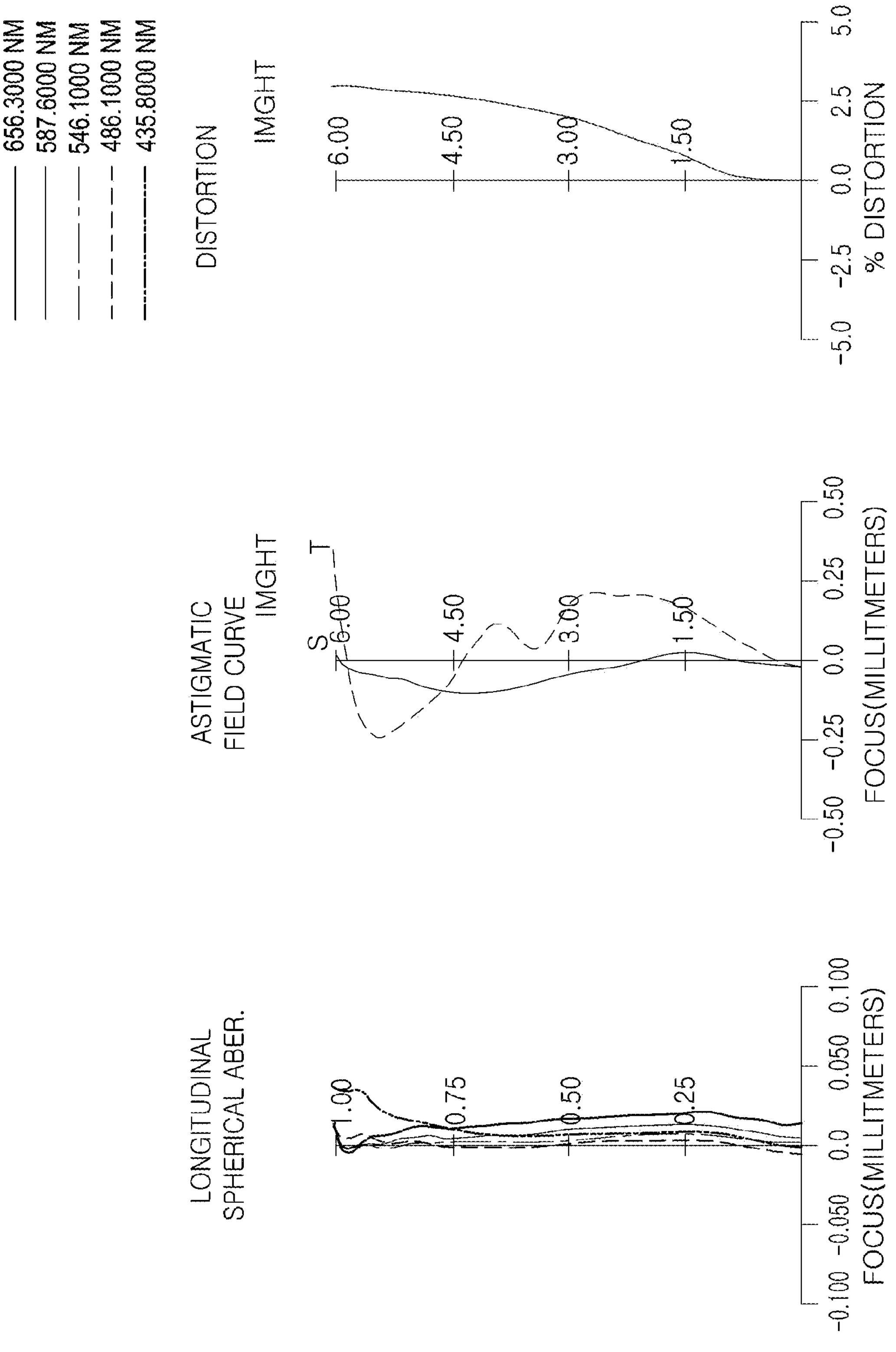
FIG. 10 is aberration curves of the imaging lens system illustrated in FIG. 9.

Tables 9 and 10 list lens characteristics and aspheric values of the imaging lens system according to the present embodiment. FIG. 10 is aberration curves of the imaging lens system according to the present embodiment.

TABLE 9

| Surface No. | Components | Radius of curvature | 두께거리 | Refractive index | Abbe number | Effective Radius |
|---|---|---|---|---|---|---|
| S1 | First lens | 2.630 | 1.076 | 1.546 | 55.990 | 2.059 |
| S2 | | 9.758 | 0.070 | | | 1.907 |
| S3 | Second lens | 6.747 | 0.200 | 1.689 | 18.152 | 1.832 |
| S4 | Stop | 3.922 | 0.296 | | | 1.673 |
| S5 | Third lens | 7.577 | 0.396 | 1.571 | 37.403 | 1.636 |
| S6 | | 15.673 | 0.385 | | | 1.517 |
| S7 | Fourth lens | 996.070 | 0.261 | 1.689 | 18.152 | 1.537 |
| S8 | | 33.721 | 0.177 | | | 1.756 |
| S9 | Fifth lens | 113.238 | 0.384 | 1.546 | 55.990 | 2.094 |
| S10 | | −69.494 | 0.554 | | | 2.237 |
| S11 | Sixth lens | 8.539 | 0.414 | 1.571 | 37.403 | 2.591 |
| S12 | | 8.758 | 0.335 | | | 2.945 |
| S13 | Seventh lens | 2.600 | 0.450 | 1.546 | 55.990 | 3.161 |
| S14 | | 5.648 | 0.990 | | | 3.510 |
| S15 | Eighth lens | 64.504 | 0.430 | 1.537 | 55.735 | 4.490 |
| S16 | | 2.348 | 0.142 | | | 4.660 |
| S17 | Filter | infinity | 0.110 | 1.519 | 64.197 | 5.769 |
| S18 | | infinity | 0.747 | | | 5.815 |
| S19 | Imaging plane | infinity | 0.002 | | | 6.415 |

TABLE 10

| Surface No. | S1 | S2 | S3 | S4 | S5 | S6 | S7 | S8 |
|---|---|---|---|---|---|---|---|---|
| K | −4.51E−01 | 1.42E+01 | −8.07E+00 | −3.44E+00 | 1.36E+01 | 8.90E+01 | 0.00E+00 | 0.00E+00 |
| 4th order term | 3.02E−03 | −3.21E−03 | −1.23E−02 | −6.30E−03 | −1.16E−02 | −1.18E−02 | −2.41E−02 | −2.33E−02 |

TABLE 10-continued

| | | | | | | | | |
|---|---|---|---|---|---|---|---|---|
| 6th order term | 6.69E−04 | −2.86E−03 | 6.17E−03 | −7.45E−03 | −6.01E−03 | 1.84E−02 | 2.41E−03 | −6.28E−03 |
| 8th order term | 2.93E−03 | 2.85E−02 | 2.55E−02 | 8.83E−02 | 3.33E−02 | −1.48E−01 | −5.56E−02 | 3.25E−02 |
| 10th order term | −1.13E−02 | −7.69E−02 | −8.48E−02 | −3.13E−01 | −1.29E−01 | 6.00E−01 | 1.70E−01 | −1.25E−01 |
| 12th order term | 2.15E−02 | 1.29E−01 | 1.65E−01 | 7.32E−01 | 2.99E−01 | −1.58E+00 | −3.29E−01 | 2.84E−01 |
| 14th order term | −2.55E−02 | −1.50E−01 | −2.25E−01 | −1.20E+00 | −4.50E−01 | 2.84E+00 | 3.95E−01 | −4.38E−01 |
| 16th order term | 2.03E−02 | 1.24E−01 | 2.22E−01 | 1.40E+00 | 4.63E−01 | −3.60E+00 | −2.75E−01 | 4.76E−01 |
| 18th order term | −1.13E−02 | −7.41E−02 | −1.57E−01 | −1.17E+00 | −3.31E−01 | 3.25E+00 | 6.23E−02 | −3.68E−01 |
| 20th order term | 4.45E−03 | 3.19E−02 | 8.01E−02 | 7.00E−01 | 1.64E−01 | −2.11E+00 | 7.08E−02 | 2.04E−01 |
| 22nd order term | −1.23E−03 | −9.81E−03 | −2.89E−02 | −2.97E−01 | −5.50E−02 | 9.70E−01 | −8.06E−02 | −8.03E−02 |
| 24th order term | 2.33E−04 | 2.10E−03 | 7.20E−03 | 8.72E−02 | 1.17E−02 | −3.10E−01 | 4.03E−02 | 2.18E−02 |
| 26th order term | −2.90E−05 | −2.96E−04 | −1.18E−03 | −1.68E−02 | −1.33E−03 | 6.50E−02 | −1.14E−02 | −3.91E−03 |
| 28th order term | 2.12E−06 | 2.47E−05 | 1.14E−04 | 1.90E−03 | 3.88E−05 | −8.08E−03 | 1.79E−03 | 4.12E−04 |
| 30th order term | −6.91E−08 | −9.30E−07 | −4.90E−06 | −9.62E−05 | 4.39E−06 | 4.49E−04 | −1.20E−04 | −1.95E−05 |

| Surface No. | S9 | S10 | S11 | S12 | S13 | S14 | S15 | S16 |
|---|---|---|---|---|---|---|---|---|
| K | 9.90E+01 | 9.90E+01 | 0.00E+00 | −7.02E+01 | −1.73E+01 | −3.67E+01 | 3.09E+01 | −1.53E+01 |
| 4th order term | −3.85E−02 | −4.41E−02 | −3.79E−02 | −8.16E−02 | 3.92E−02 | 7.98E−03 | −1.95E−01 | −8.94E−02 |
| 6th order term | 2.76E−02 | 3.92E−02 | 3.81E−02 | 9.50E−02 | −4.46E−02 | 1.62E−02 | 1.25E−01 | 5.04E−02 |
| 8th order term | −6.16E−02 | −1.04E−01 | −3.93E−02 | −1.12E−01 | 3.59E−02 | −2.53E−02 | −6.03E−02 | −2.08E−02 |
| 10th order term | 1.27E−01 | 2.00E−01 | 1.79E−02 | 9.75E−02 | −3.12E−02 | 1.39E−02 | 2.02E−02 | 5.99E−03 |
| 12th order term | −1.88E−01 | −2.60E−01 | 8.02E−03 | −6.02E−02 | 2.02E−02 | −4.54E−03 | −4.61E−03 | −1.21E−03 |
| 14th order term | 1.97E−01 | 2.36E−01 | −1.89E−02 | 2.63E−02 | −9.09E−03 | 1.00E−03 | 7.37E−04 | 1.76E−04 |
| 16th order term | −1.50E−01 | −1.52E−01 | 1.45E−02 | −8.16E−03 | 2.85E−03 | −1.57E−04 | −8.45E−05 | −1.89E−05 |
| 18th order term | 8.23E−02 | 7.00E−02 | −6.64E−03 | 1.80E−03 | −6.34E−04 | 1.83E−05 | 7.07E−06 | 1.51E−06 |
| 20th order term | −3.26E−02 | −2.31E−02 | 2.02E−03 | −2.81E−04 | 1.00E−04 | −1.64E−06 | −4.33E−07 | −9.05E−08 |
| 22nd order term | 9.19E−03 | 5.39E−03 | −4.16E−04 | 3.03E−05 | −1.12E−05 | 1.15E−07 | 1.92E−08 | 4.03E−09 |
| 24th order term | −1.78E−03 | −8.65E−04 | 5.76E−05 | −2.17E−06 | 8.54E−07 | −6.31E−09 | −6.03E−10 | −1.29E−10 |
| 26th order term | 2.25E−04 | 9.06E−05 | −5.14E−06 | 9.57E−08 | −4.25E−08 | 2.56E−10 | 1.27E−11 | 2.82E−12 |

TABLE 10-continued

| | | | | | | | | |
|---|---|---|---|---|---|---|---|---|
| 28th order term | −1.66E−05 | −5.57E−06 | 2.66E−07 | −2.24E−09 | 1.24E−09 | −6.64E−12 | −1.60E−13 | −3.74E−14 |
| 30th order term | 5.45E−07 | 1.52E−07 | −6.08E−09 | 1.82E−11 | −1.61E−11 | 8.02E−14 | 9.24E−16 | 2.26E−16 |

Figure 11:
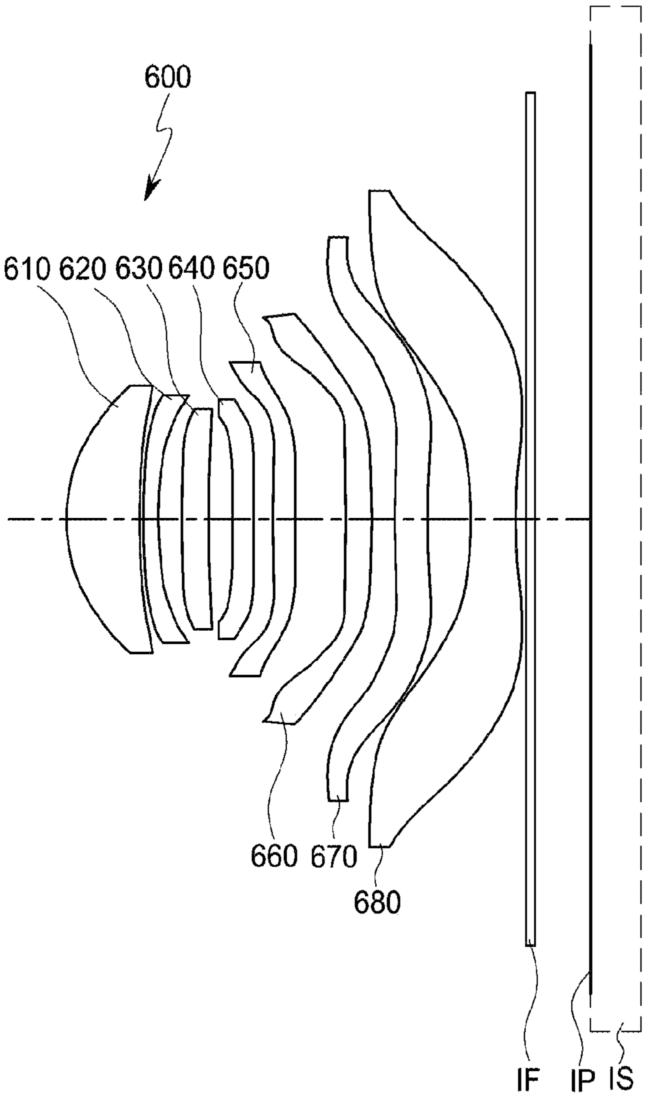
FIG. 11 is a diagram illustrating an imaging lens system according to a sixth embodiment of the present disclosure.

An imaging lens system according to a sixth embodiment will be described with reference to FIG. 11.

The imaging lens system 600 may include a first lens 610, a second lens 620, a third lens 630, a fourth lens 640, a fifth lens 650, a sixth lens 660, a seventh lens 670, and an eighth lens 680.

The first lens 610 may have positive refractive power, and may have a convex object-side surface and a concave image-side surface. The second lens 620 may have negative refractive power, and may have a convex object-side surface and a concave image-side surface. The third lens 630 may have positive refractive power, and may have a convex object-side surface and a concave image-side surface. The fourth lens 640 may have negative refractive power, and may have a convex object-side surface and a concave image-side surface. The fifth lens 650 may have positive refractive power, and may have a convex object-side surface and a concave image-side surface. The sixth lens 660 may have positive refractive power and may have a convex object-side surface and a convex image-side surface. Also, an inflection point may be formed on an object-side surface and an image-side surface of the sixth lens 660. The seventh lens 670 may have positive refractive power, and may have a convex object-side surface and a concave image-side surface. Also, an inflection point may be formed on an object-side surface and an image-side surface of the seventh lens 670. The eighth lens 680 may have negative refractive power, and may have a concave object-side surface and a concave image-side surface. Also, an inflection point may be formed on an object-side surface and an image-side surface of the eighth lens 680.

The imaging lens system 600 may further include a filter IF and an imaging plane IP. The filter IF may be disposed between the eighth lens 680 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 12:
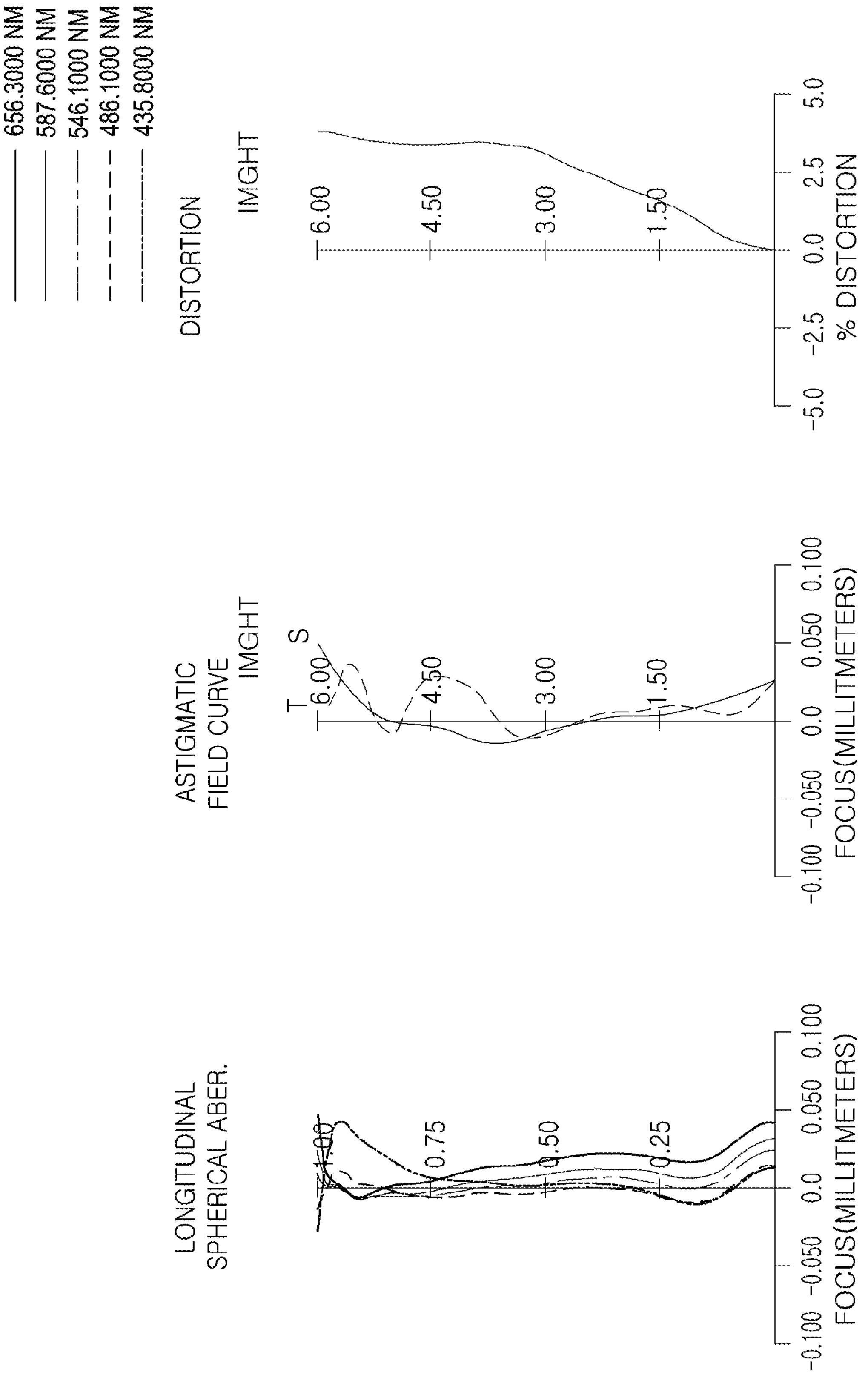
FIG. 12 is aberration curves of the imaging lens system illustrated in FIG. 11.

Tables 11 and 12 list lens characteristics and aspheric values of the imaging lens system according to the present embodiment. FIG. 12 is aberration curves of the imaging lens system according to the present embodiment.

TABLE 11

| Surface No. | Components | Radius of curvature | Thickness/ Distance | Refractive index | Abbe number | Effective Radius |
|---|---|---|---|---|---|---|
| S1 | First lens | 2.240 | 0.966 | 1.546 | 55.990 | 1.801 |
| S2 | | 9.963 | 0.050 | | | 1.695 |
| S3 | Second lens | 12.259 | 0.180 | 1.689 | 18.152 | 1.647 |
| S4 | Stop | 5.215 | 0.306 | | | 1.523 |
| S5 | Third lens | 11.882 | 0.380 | 1.546 | 55.990 | 1.476 |
| S6 | | 21.829 | 0.301 | | | 1.367 |
| S7 | Fourth lens | 45.166 | 0.277 | 1.679 | 19.238 | 1.382 |
| S8 | | 18.578 | 0.274 | | | 1.596 |
| S9 | Fifth lens | 10.713 | 0.270 | 1.620 | 25.936 | 1.803 |
| S10 | | 17.903 | 0.677 | | | 2.109 |
| S11 | Sixth lens | 24.782 | 0.322 | 1.571 | 37.403 | 2.519 |
| S12 | | −30.448 | 0.307 | | | 2.795 |
| S13 | Seventh lens | 7.690 | 0.430 | 1.546 | 55.990 | 3.626 |
| S14 | | 23.875 | 0.561 | | | 3.810 |
| S15 | Eighth lens | −7.496 | 0.590 | 1.537 | 55.735 | 4.253 |
| S16 | | 3.992 | 0.145 | | | 4.432 |
| S17 | Filter | infinity | 0.110 | 1.519 | 64.197 | 5.715 |
| S18 | | infinity | 0.770 | | | 5.760 |
| S19 | Imaging plane | infinity | -0.025 | | | 6.435 |

TABLE 12

| Surface No. | S1 | S2 | S3 | S4 | S5 | S6 | S7 | S8 |
|---|---|---|---|---|---|---|---|---|
| K | −4.65E−01 | 1.51E+01 | 4.94E+01 | 5.03E+00 | 6.01E+01 | −5.36E+01 | 0.00E+00 | 0.00E+00 |
| 4th order term | 8.18E−03 | −1.27E−02 | −1.24E−02 | −9.56E−03 | −9.16E−03 | −1.20E−02 | 4.96E−02 | −5.12E−02 |
| 6th order term | −2.43E−02 | 4.57E−02 | 4.99E−02 | 9.70E−02 | −7.19E−02 | −7.81E−02 | 4.33E−02 | 3.67E−02 |
| 8th order term | 1.03E−01 | −1.66E−01 | −1.16E−01 | −5.70E−01 | 4.71E−01 | 7.86E−01 | −3.22E−01 | −9.90E−02 |
| 10th order term | −2.68E−01 | 5.30E−01 | 3.13E−01 | 2.44E+00 | −1.78E+00 | −4.17E+00 | 1.69E+00 | 2.16E−01 |
| 12th order term | 4.69E−01 | −1.18E+00 | −7.07E−01 | −6.98E+00 | 4.45E+00 | 1.39E+01 | −6.01E+00 | −3.27E−01 |

TABLE 12-continued

| | | | | | | | | |
|---|---|---|---|---|---|---|---|---|
| 14th order term | −5.75E−01 | 1.81E+00 | 1.15E+00 | 1.36E+01 | −7.67E+00 | −3.10E+01 | 1.45E+01 | 2.62E−01 |
| 16th order term | 5.06E−01 | −1.92E+00 | −1.31E+00 | −1.87E+01 | 9.37E+00 | 4.80E+01 | −2.47E+01 | 3.16E−02 |
| 18th order term | −3.22E−01 | 1.46E+00 | 1.07E+00 | 1.83E+01 | −8.25E+00 | −5.26E+01 | 2.98E+01 | −3.40E−01 |
| 20th order term | 1.49E−01 | −7.88E−01 | −6.21E−01 | −1.28E+01 | 5.24E+00 | 4.11E+01 | −2.57E+01 | 4.17E−01 |
| 22nd order term | −4.91E−02 | 3.02E−01 | 2.56E−01 | 6.40E+00 | −2.39E+00 | −2.27E+01 | 1.58E+01 | −2.82E−01 |
| 24th order term | 1.14E−02 | −8.02E−02 | −7.32E−02 | −2.21E+00 | 7.69E−01 | 8.65E+00 | −6.69E+00 | 1.19E−01 |
| 26th order term | −1.74E−03 | 1.40E−02 | 1.37E−02 | 5.04E−01 | −1.66E−01 | −2.16E+00 | 1.87E+00 | −3.12E−02 |
| 28th order term | 1.58E−04 | −1.44E−03 | −1.52E−03 | −6.80E−02 | 2.17E−02 | 3.18E−01 | −3.09E−01 | 4.67E−03 |
| 30th order term | −6.50E−06 | 6.66E−05 | 7.48E−05 | 4.12E−03 | −1.32E−03 | −2.09E−02 | 2.28E−02 | −3.05E−04 |

| Surface No | S9 | S10 | S11 | S12 | S13 | S14 | S15 | S16 |
|---|---|---|---|---|---|---|---|---|
| K | −3.91E+01 | −7.76E+01 | 0.00E+00 | 5.14E+01 | −1.58E+01 | −2.46E+00 | −9.20E+01 | −1.11E+01 |
| 4th order term | −4.08E−02 | −3.87E−02 | −4.47E−04 | 1.32E−02 | 4.18E−02 | 7.29E−02 | −3.80E−02 | −3.18E−02 |
| 6th order term | −6.73E−02 | −3.20E−02 | −4.66E−02 | −9.45E−02 | −9.66E−02 | −8.41E−02 | −1.76E−02 | −3.30E−04 |
| 8th order term | 3.71E−01 | 1.35E−01 | 8.14E−02 | 1.60E−01 | 7.81E−02 | 4.51E−02 | 2.05E−02 | 3.09E−03 |
| 10th order term | −1.07E+00 | −2.95E−01 | −9.74E−02 | −1.85E−01 | −5.04E−02 | −1.78E−02 | −9.65E−03 | −1.26E−03 |
| 12th order term | 1.98E+00 | 4.11E−01 | 7.18E−02 | 1.46E−01 | 2.39E−02 | 5.25E−03 | 2.78E−03 | 3.00E−04 |
| 14th order term | −2.50E+00 | −3.87E−01 | −3.27E−02 | −8.10E−02 | −7.83E−03 | −1.09E−03 | −5.36E−04 | −4.76E−05 |
| 16th order term | 2.22E+00 | 2.54E−01 | 8.13E−03 | 3.18E−02 | 1.76E−03 | 1.55E−04 | 7.22E−05 | 5.07E−06 |
| 18th order term | −1.41E+00 | −1.17E−01 | −2.90E−04 | −8.94E−03 | −2.77E−04 | −1.46E−05 | −6.96E−06 | −3.41E−07 |
| 20th order term | 6.41E−01 | 3.81E−02 | −4.99E−04 | 1.80E−03 | 3.08E−05 | 8.47E−07 | 4.83E−07 | 1.16E−08 |
| 22nd order term | −2.07E−01 | −8.62E−03 | 1.76E−04 | −2.57E−04 | −2.42E−06 | −2.23E−08 | −2.40E−08 | 1.13E−10 |
| 24th order term | 4.60E−02 | 1.32E−03 | −3.08E−05 | 2.54E−05 | 1.31E−07 | −4.95E−10 | 8.33E−10 | −3.04E−11 |
| 26th order term | −6.73E−03 | −1.29E−04 | 3.09E−06 | −1.66E−06 | −4.69E−09 | 6.00E−11 | −1.92E−11 | 1.35E−12 |
| 28th order term | 5.78E−04 | 7.28E−06 | −1.70E−07 | 6.45E−08 | 9.97E−11 | −1.87E−12 | 2.65E−13 | −2.75E−14 |
| 30th order term | −2.22E−05 | −1.77E−07 | 4.02E−09 | −1.13E−09 | −9.56E−13 | 2.13E−14 | −1.64E−15 | 2.24E−16 |

Figure 13:
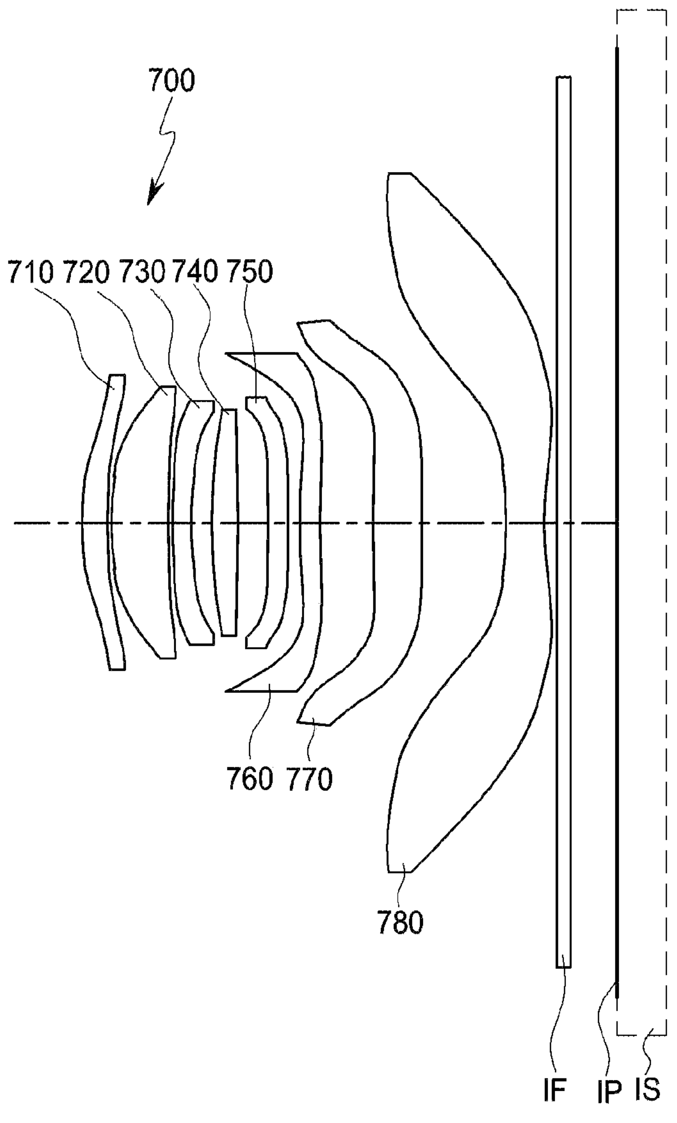
FIG. 13 is a diagram illustrating an imaging lens system according to a seventh embodiment of the present disclosure.

An imaging lens system according to a seventh embodiment will be described with reference to FIG. 13.

The imaging lens system 700 may include a first lens 710, a second lens 720, a third lens 730, a fourth lens 740, a fifth lens 750, a sixth lens 760, a seventh lens 770, and an eighth lens 780.

The first lens 710 may have positive refractive power, and may have a convex object-side surface and a concave image-side surface. The second lens 720 may have positive refractive power, and may have a convex object-side surface and a concave image-side surface. The third lens 730 may have negative refractive power, and may have a convex object-side surface and a concave image-side surface. The fourth lens 740 may have positive refractive power, and may have a convex object-side surface and a concave image-side surface. The fifth lens 750 may have negative refractive power, and may have a convex object-side surface and a concave image-side surface. The sixth lens 760 may have positive refractive power, and may have a convex object-side surface and a concave image-side surface. Also, an inflection point may be formed on an object-side surface and an image-side surface of the sixth lens 760. The seventh lens 770 may have positive refractive power and may have a convex object-side surface and a concave image-side surface. Also, an inflection point may be formed on an object-side surface and an image-side surface of the seventh lens 770. The eighth lens 780 may have negative refractive power, and may have a convex object-side surface and a concave image-side surface. Also, an inflection point may be formed on an object-side surface and an image-side surface of the eighth lens 780.

The imaging lens system 700 may further include a filter IF and an imaging plane IP. The filter IF may be disposed between the eighth lens 780 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 14:
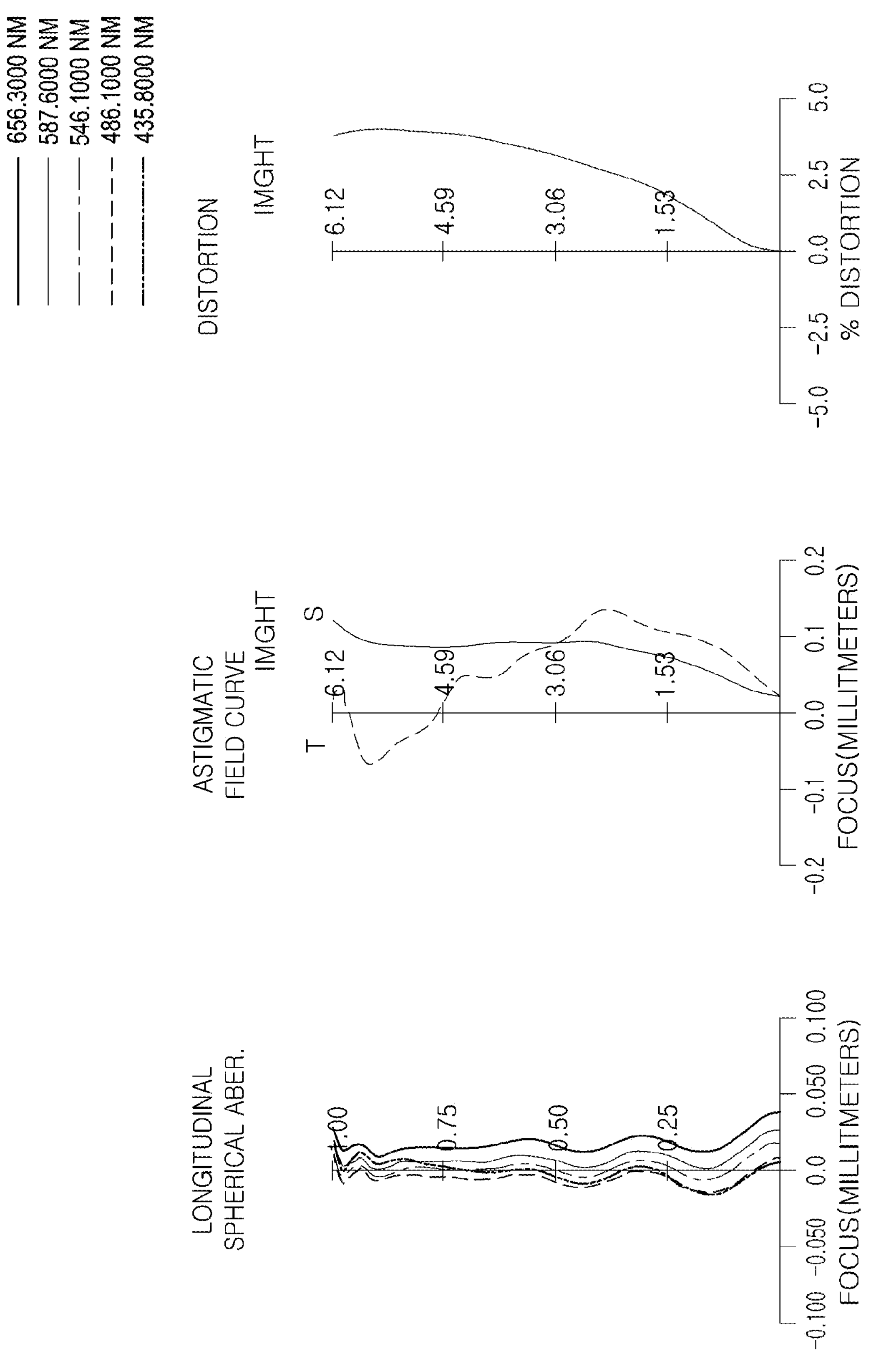
FIG. 14 is aberration curves of the imaging lens system illustrated in FIG. 13.

Tables 13 and 14 list lens characteristics and aspheric values of the imaging lens system according to the present embodiment. FIG. 14 is aberration curves of the imaging lens system according to the present embodiment.

TABLE 13

| Surface No. | Components | Radius of curvature | Thickness/ Distance | Refractive index | Abbe number | Effective Radius |
|---|---|---|---|---|---|---|
| S1 | First lens | 2.746 | 0.352 | 1.546 | 55.990 | 2.020 |
| S2 | | 6.000 | 0.054 | | | 1.973 |
| S3 | Second lens | 5.141 | 0.757 | 1.546 | 55.990 | 1.830 |
| S4 | Stop | 16.285 | 0.055 | | | 1.758 |
| S5 | Third lens | 9.193 | 0.230 | 1.689 | 18.152 | 1.650 |
| S6 | | 4.856 | 0.293 | | | 1.503 |
| S7 | Fourth lens | 8.673 | 0.324 | 1.537 | 55.735 | 1.490 |
| S8 | | 16.030 | 0.418 | | | 1.527 |
| S9 | Fifth lens | 3654.934 | 0.230 | 1.689 | 18.152 | 1.544 |
| S10 | | 17.455 | 0.163 | | | 1.693 |
| S11 | Sixth lens | 6.134 | 0.259 | 1.571 | 37.403 | 1.855 |
| S12 | | 8.811 | 0.709 | | | 2.286 |
| S13 | Seventh lens | 8.117 | 0.638 | 1.620 | 25.936 | 2.498 |
| S14 | | 53.797 | 1.105 | | | 2.828 |
| S15 | Eighth lens | 359.463 | 0.480 | 1.537 | 55.735 | 4.521 |
| S16 | | 2.890 | 0.176 | | | 4.736 |
| S17 | Filter | infinity | 0.110 | 1.519 | 64.197 | 5.947 |
| S18 | | infinity | 0.770 | | | 6.026 |
| S19 | Imaging plane | infinity | −0.020 | | | 6.121 |

TABLE 14

| Surface No. | S1 | S2 | S3 | S4 | S5 | S6 | S7 | S8 |
|---|---|---|---|---|---|---|---|---|
| K | −6.39E+00 | −9.07E+00 | 4.77E+00 | 6.46E+01 | 2.69E+01 | 7.25E+00 | −3.39E+01 | −9.12E+01 |
| 4th order term | 1.52E−02 | −2.21E−02 | −2.11E−02 | −6.84E−02 | −7.68E−02 | −7.54E−02 | −5.55E−03 | 6.25E−03 |
| 6th order term | −8.20E−03 | 4.23E−02 | 1.58E−01 | 3.19E−01 | 2.21E−01 | 3.35E−01 | −9.22E−02 | −1.88E−01 |
| 8th order term | −6.00E−03 | −1.39E−02 | −4.03E−01 | −1.02E+00 | −5.53E−01 | −1.37E+00 | 6.34E−01 | 1.00E+00 |
| 10th order term | 4.29E−03 | −4.44E−02 | 8.37E−01 | 2.32E+00 | 1.21E+00 | 4.02E+00 | −2.55E+00 | −3.31E+00 |
| 12th order term | −1.78E−04 | 8.97E−02 | −1.26E+00 | −3.74E+00 | −2.09E+00 | −8.23E+00 | 6.73E+00 | 7.33E+00 |
| 14th order term | 9.49E−04 | −9.42E−02 | 1.34E+00 | 4.28E+00 | 2.77E+00 | 1.19E+01 | −1.23E+01 | −1.14E+01 |

TABLE 14-continued

| | | | | | | | | |
|---|---|---|---|---|---|---|---|---|
| 16th order term | −3.26E−03 | 6.45E−02 | −1.02E+00 | −3.55E+00 | −2.74E+00 | −1.25E+01 | 1.58E+01 | 1.28E+01 |
| 18th order term | 3.35E−03 | −3.03E−02 | 5.66E−01 | 2.14E+00 | 2.01E+00 | 9.52E+00 | −1.47E+01 | −1.05E+01 |
| 20th order term | −1.87E−03 | 9.81E−03 | −2.25E−01 | −9.39E−01 | −1.09E+00 | −5.27E+00 | 9.80E+00 | 6.26E+00 |
| 22nd order term | 6.50E−04 | −2.18E−03 | 6.35E−02 | 2.96E−01 | 4.25E−01 | 2.10E+00 | −4.66E+00 | −2.71E+00 |
| 24th order term | −1.44E−04 | 3.19E−04 | −1.23E−02 | −6.54E−02 | −1.16E−01 | −5.82E−01 | 1.54E+00 | 8.27E−01 |
| 26th order term | 2.00E−05 | −2.87E−05 | 1.54E−03 | 9.58E−03 | 2.12E−02 | 1.07E−01 | −3.37E−01 | −1.69E−01 |
| 28th order term | −1.58E−06 | 1.35E−06 | −1.10E−04 | −8.35E−04 | −2.29E−03 | −1.17E−02 | 4.36E−02 | 2.06E−02 |
| 30th order term | 5.50E−08 | −2.02E−08 | 3.32E−06 | 3.28E−05 | 1.12E−04 | 5.78E−04 | −2.54E−03 | −1.14E−03 |

| Surface No. | S9 | S10 | S11 | S12 | S13 | S14 | S15 | S16 |
|---|---|---|---|---|---|---|---|---|
| K | 0.00E+00 | 0.00E+00 | 0.00E+00 | −4.05E−01 | 4.57E+00 | −7.63E+01 | 0.00E+00 | −1.48E+01 |
| 4th order term | 5.15E−03 | −1.83E−02 | −6.94E−02 | −5.58E−02 | −3.64E−02 | −1.39E−02 | −1.06E−01 | −4.39E−02 |
| 6th order term | −3.09E−01 | −1.76E−01 | 2.34E−02 | −9.27E−03 | 5.53E−03 | −7.69E−03 | 4.50E−02 | 1.41E−02 |
| 8th order term | 1.56E+00 | 7.27E−01 | 1.07E−01 | 1.40E−01 | −5.27E−03 | 7.86E−03 | −1.98E−02 | −4.18E−03 |
| 10th order term | −5.49E+00 | −1.87E+00 | −3.72E−01 | −2.83E−01 | −5.86E−03 | −9.72E−03 | 6.73E−03 | 8.88E−04 |
| 12th order term | 1.34E+01 | 3.23E+00 | 7.42E−01 | 3.42E−01 | 1.44E−02 | 8.27E−03 | −1.54E−03 | −1.16E−04 |
| 14th order term | −2.31E+01 | −3.90E+00 | −1.05E+00 | −2.82E−01 | −1.25E−02 | −4.59E−03 | 2.44E−04 | 7.50E−06 |
| 16th order term | 2.88E+01 | 3.38E+00 | 1.08E+00 | 1.64E−01 | 6.12E−03 | 1.72E−03 | −2.76E−05 | 2.03E−07 |
| 18th order term | −2.62E+01 | −2.12E+00 | −8.07E−01 | −6.82E−02 | −1.79E−03 | −4.47E−04 | 2.26E−06 | −9.26E−08 |
| 20th order term | 1.73E+01 | 9.68E−01 | 4.33E−01 | 2.03E−02 | 2.90E−04 | 8.09E−05 | −1.35E−07 | 9.61E−09 |
| 22nd order term | −8.24E+00 | −3.19E−01 | −1.65E−01 | −4.31E−03 | −1.44E−05 | −1.01E−05 | 5.86E−09 | −5.72E−10 |
| 24th order term | 2.75E+00 | 7.42E−02 | 4.34E−02 | 6.34E−04 | −3.54E−06 | 8.55E−07 | −1.79E−10 | 2.16E−11 |
| 26th order term | −6.10E−01 | −1.17E−02 | −7.48E−03 | −6.15E−05 | 7.44E−07 | −4.65E−08 | 3.66E−12 | −5.14E−13 |
| 28th order term | 8.08E−02 | 1.14E−03 | 7.59E−04 | 3.54E−06 | −5.75E−08 | 1.46E−09 | −4.49E−14 | 7.03E−15 |
| 30th order term | −4.83E−03 | −5.25E−05 | −3.43E−05 | −9.14E−08 | 1.68E−09 | −2.01E−11 | 2.50E−16 | −4.23E−01 |

Figure 15:
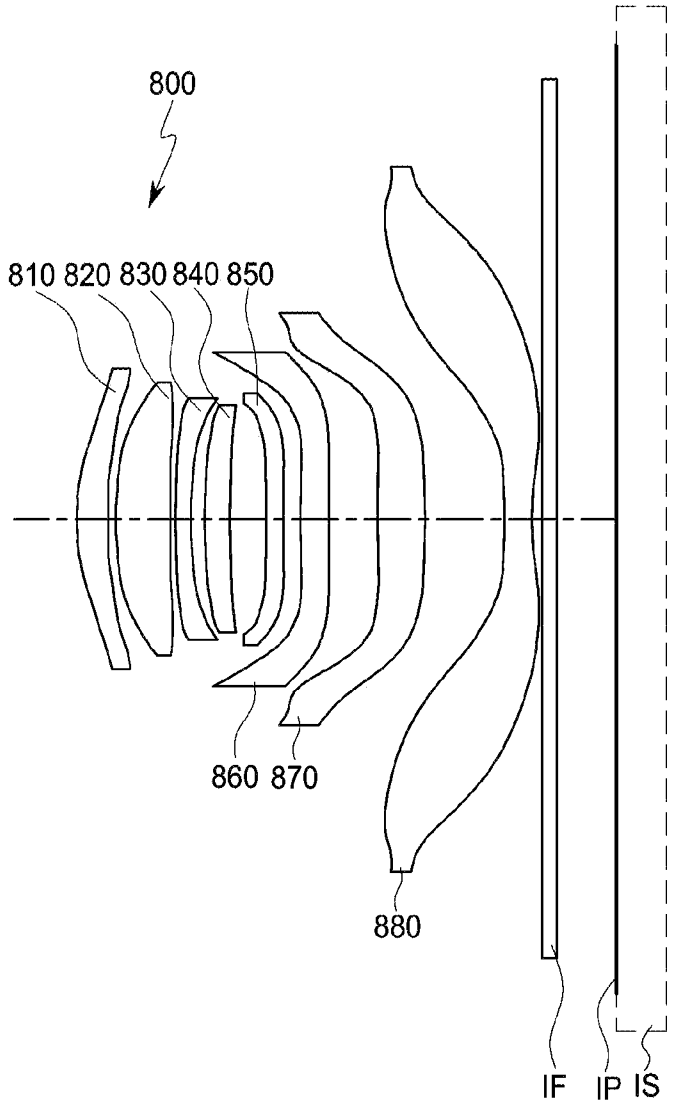
FIG. 15 is a diagram illustrating an imaging lens system according to an eighth embodiment of the present disclosure.

An imaging lens system according to an eighth embodiment will be described with reference to FIG. 15.

The imaging lens system 800 may include a first lens 810, a second lens 820, a third lens 830, a fourth lens 840, a fifth lens 850, a sixth lens 860, a seventh lens 870, and an eighth lens 880.

The first lens 810 may have positive refractive power, and may have a convex object-side surface and a concave image-side surface. The second lens 820 may have positive refractive power, and may have a convex object-side surface and a concave image-side surface. The third lens 830 may have negative refractive power, and may have a convex object-side surface and a concave image-side surface. The fourth lens 840 may have positive refractive power, and may have a convex object-side surface and a concave image-side surface. The fifth lens 850 may have negative refractive power, and may have a concave object-side surface and a concave image-side surface. The sixth lens 860 may have positive refractive power, and may have a convex object-side surface and a concave image-side surface. Also, an inflection point may be formed on an object-side surface and an image-side surface of the sixth lens 860. The seventh lens 870 may have positive refractive power and may have a convex object-side surface and a convex image-side surface. Also, an inflection point may be formed on an object-side surface and an image-side surface of the seventh lens 870. The eighth lens 880 may have negative refractive power, and may have a convex object-side surface and a concave image-side surface. Also, an inflection point may be formed on an object-side surface and an image-side surface of the eighth lens 880.

The imaging lens system 800 may further include a filter IF and an imaging plane IP. The filter IF may be disposed between the eighth lens 880 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 16:
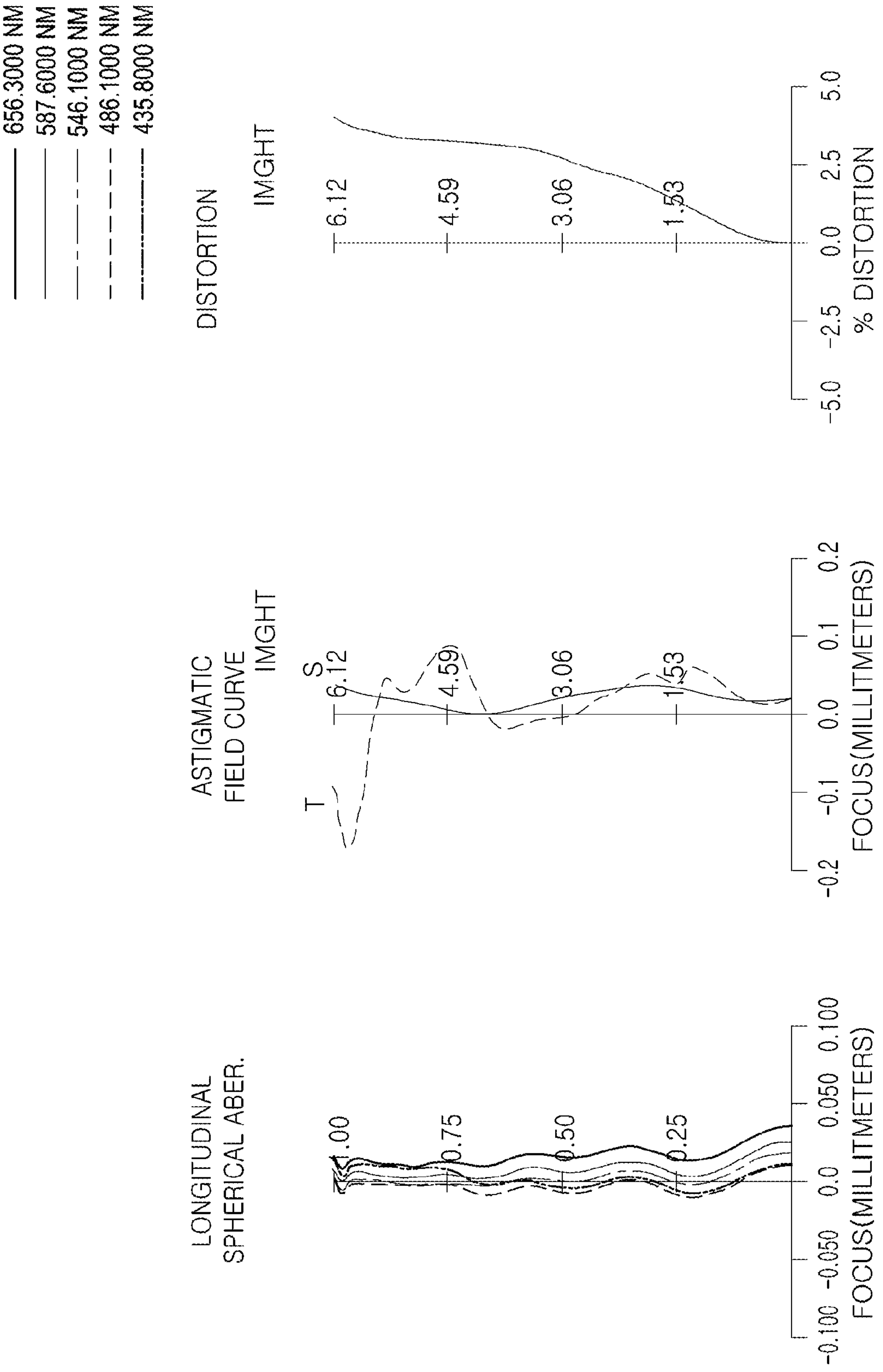
FIG. 16 is aberration curves of the imaging lens system illustrated in FIG. 15.

Tables 15 and 16 list lens characteristics and aspheric values of the imaging lens system according to the present embodiment. FIG. 16 is aberration curves of the imaging lens system according to the present embodiment.

TABLE 15

| Surface No. | Components | Radius of curvature | Thickness/Distance | Refractive index | Abbe number | Effective Radius |
|---|---|---|---|---|---|---|
| S1 | First lens | 2.724 | 0.416 | 1.546 | 55.990 | 2.007 |
| S2 | | 5.787 | 0.092 | | | 1.942 |
| S3 | Second lens | 5.143 | 0.725 | 1.546 | 55.990 | 1.845 |
| S4 | Stop | 16.934 | 0.072 | | | 1.776 |
| S5 | Third lens | 10.531 | 0.200 | 1.689 | 18.152 | 1.626 |
| S6 | | 4.910 | 0.186 | | | 1.536 |
| S7 | Fourth lens | 6.561 | 0.323 | 1.537 | 55.735 | 1.536 |
| S8 | | 12.445 | 0.485 | | | 1.530 |
| S9 | Fifth lens | −2061.103 | 0.233 | 1.689 | 18.152 | 1.547 |
| S10 | | 26.456 | 0.224 | | | 1.683 |
| S11 | Sixth lens | 12.757 | 0.371 | 1.620 | 25.936 | 1.796 |
| S12 | | 14.866 | 0.629 | | | 2.234 |
| S13 | Seventh lens | 8.209 | 0.618 | 1.571 | 37.403 | 2.400 |
| S14 | | −26.138 | 1.060 | | | 2.781 |
| S15 | Eighth lens | 35.948 | 0.340 | 1.537 | 55.735 | 4.590 |
| S16 | | 2.456 | 0.156 | | | 4.757 |
| S17 | Filter | infinity | 0.210 | 1.519 | 64.197 | 5.877 |
| S18 | | infinity | 0.729 | | | 5.957 |
| S19 | Imaging plane | infinity | −0.020 | | | 6.139 |

TABLE 16

| Surface No. | S1 | S2 | S3 | S4 | S5 | S6 | S7 | S8 |
|---|---|---|---|---|---|---|---|---|
| K | −5.16E+00 | −9.02E+00 | 2.15E+00 | 9.79E+00 | 3.12E+01 | 6.35E+00 | −5.77E+00 | 2.56E+01 |
| 4th order term | 2.02E−02 | −6.42E−03 | −1.46E−02 | −3.58E−02 | −6.19E−02 | −5.43E−02 | 1.71E−02 | 6.83E−03 |
| 6th order term | −1.28E−02 | 3.33E−03 | 1.34E−01 | 1.33E−01 | 1.12E−01 | 4.45E−02 | −3.80E−01 | −2.47E−01 |
| 8th order term | −1.90E−02 | −5.51E−02 | −5.08E−01 | −3.74E−01 | −1.50E−01 | 8.77E−02 | 2.15E+00 | 1.80E+00 |
| 10th order term | 7.20E−02 | 2.04E−01 | 1.29E+00 | 8.23E−01 | 2.26E−01 | −4.24E−01 | −7.34E+00 | −7.55E+00 |
| 12th order term | −1.23E−01 | −3.79E−01 | −2.17E+00 | −1.36E+00 | −4.52E−01 | 8.44E−01 | 1.66E+01 | 2.03E+01 |
| 14th order term | 1.31E−01 | 4.45E−01 | 2.55E+00 | 1.64E+00 | 7.93E−01 | −1.03E+00 | −2.60E+01 | −3.71E+01 |
| 16th order term | −9.41E−02 | −3.56E−01 | −2.14E+00 | −1.44E+00 | −9.85E−01 | 8.35E−01 | 2.92E+01 | 4.76E+01 |
| 18th order term | 4.73E−02 | 2.01E−01 | 1.30E+00 | 9.21E−01 | 8.48E−01 | −4.53E−01 | −2.36E+01 | −4.36E+01 |

TABLE 16-continued

| | | | | | | | | |
|---|---|---|---|---|---|---|---|---|
| 20th order term | −1.69E−02 | −8.08E−02 | −5.75E−01 | −4.29E−01 | −5.10E−01 | 1.52E−01 | 1.39E+01 | 2.87E+01 |
| 22nd order term | 4.30E−03 | 2.30E−02 | 1.83E−01 | 1.43E−01 | 2.15E−01 | −2.08E−02 | −5.87E+00 | −1.35E+01 |
| 24th order term | −7.57E−04 | −4.56E−03 | −4.06E−02 | −3.36E−02 | −6.20E−02 | −5.99E−03 | 1.73E+00 | 4.40E+00 |
| 26th order term | 8.77E−05 | 5.95E−04 | 5.98E−03 | 5.23E−03 | 1.17E−02 | 3.58E−03 | −3.40E−01 | −9.49E−01 |
| 28th order term | −6.03E−06 | −4.61E−05 | −5.25E−04 | −4.86E−04 | −1.30E−03 | −7.18E−04 | 3.97E−02 | 1.21E−01 |
| 30th order term | 1.86E−07 | 1.60E−06 | 2.08E−05 | 2.04E−05 | 6.49E−05 | 5.54E−05 | −2.09E−03 | −6.99E−03 |

| Surface No. | S9 | S10 | S11 | S12 | S13 | S14 | S15 | S16 |
|---|---|---|---|---|---|---|---|---|
| K | 9.90E+01 | 0.00E+00 | 0.00E+00 | −2.51E+01 | 1.66E+00 | −5.86E+01 | 5.32E+01 | −1.34E+01 |
| 4th order term | 1.11E−02 | −1.29E−02 | −6.55E−02 | −7.17E−02 | −4.03E−02 | −1.30E−02 | −1.63E−01 | −7.79E−02 |
| 6th order term | −5.45E−01 | −3.49E−01 | −4.66E−02 | 5.58E−02 | −1.68E−02 | −2.94E−02 | 8.36E−02 | 3.80E−02 |
| 8th order term | 3.58E+00 | 2.08E+00 | 5.74E−01 | −3.90E−02 | 5.36E−02 | 5.90E−02 | −3.40E−02 | −1.41E−02 |
| 10th order term | −1.42E+01 | −7.13E+00 | −1.97E+00 | 9.88E−03 | −9.77E−02 | −8.09E−02 | 1.00E−02 | 3.85E−03 |
| 12th order term | 3.70E+01 | 1.59E+01 | 4.03E+00 | 2.36E−02 | 1.13E−01 | 7.26E−02 | −2.05E−03 | −7.76E−04 |
| 14th order term | −6.63E+01 | −2.43E+01 | −5.58E+00 | −4.31E−02 | −8.86E−02 | −4.43E−02 | 2.94E−04 | 1.16E−04 |
| 16th order term | 8.43E+01 | 2.65E+01 | 5.45E+00 | 3.86E−02 | 4.85E−02 | 1.89E−02 | −3.02E−05 | −1.30E−05 |
| 18th order term | −7.72E+01 | −2.08E+01 | −3.83E+00 | −2.20E−02 | −1.89E−02 | −5.73E−03 | 2.25E−06 | 1.09E−06 |
| 20th order term | 5.11E+01 | 1.19E+01 | 1.94E+00 | 8.50E−03 | 5.20E−03 | 1.23E−03 | −1.22E−07 | −6.81E−08 |
| 22nd order term | −2.42E+01 | −4.83E+00 | −7.05E−01 | −2.25E−03 | −1.01E−03 | −1.86E−04 | 4.75E−09 | 3.11E−09 |
| 24th order term | 7.99E+00 | 1.38E+00 | 1.79E−01 | 4.04E−04 | 1.35E−04 | 1.93E−05 | −1.28E−10 | −1.01E−10 |
| 26th order term | −1.75E+00 | −2.59E−01 | −3.01E−02 | −4.68E−05 | −1.18E−05 | −1.30E−06 | 2.27E−12 | 2.19E−12 |
| 28th order term | 2.27E−01 | 2.90E−02 | 3.01E−03 | 3.16E−06 | 6.10E−07 | 5.17E−08 | −2.35E−14 | −2.84E−14 |
| 30th order term | −1.33E−02 | −1.47E−03 | −1.36E−04 | −9.42E−08 | −1.41E−08 | −9.13E−10 | 1.05E−16 | 1.67E−16 |

Figure 17:
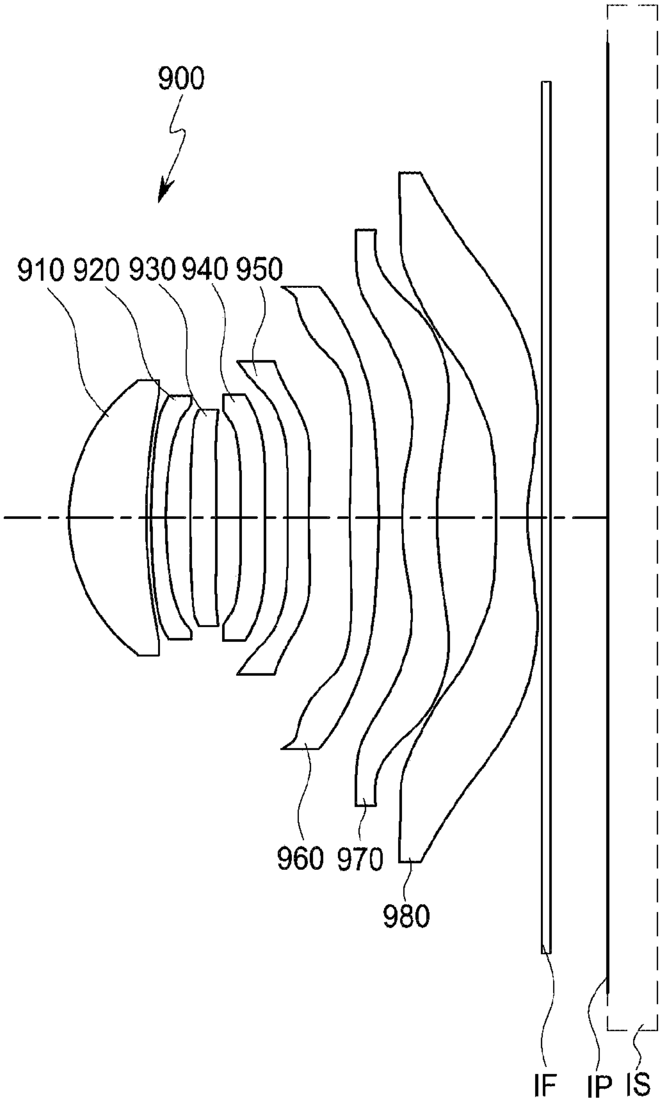
FIG. 17 is a diagram illustrating an imaging lens system according to a ninth embodiment of the present disclosure.

An imaging lens system according to a ninth embodiment will be described with reference to FIG. 17.

The imaging lens system 900 may include a first lens 910, a second lens 920, a third lens 930, a fourth lens 940, a fifth lens 950, a sixth lens 960, a seventh lens 970, and an eighth lens 980.

The first lens 910 may have positive refractive power, and may have a convex object-side surface and a concave image-side surface. The second lens 920 may have negative refractive power, and may have a convex object-side surface and a concave image-side surface. The third lens 930 may have positive refractive power, and may have a convex object-side surface and a concave image-side surface. The fourth lens 940 may have negative refractive power, and may have a convex object-side surface and a concave image-side surface. The fifth lens 950 may have positive refractive power, and may have a convex object-side surface and a concave image-side surface. The sixth lens 960 may have positive refractive power, and may have a convex object-side surface and a convex image-side surface. Also, an inflection point may be formed on an object-side surface and an image-side surface of the sixth lens 960. The seventh lens 970 may have positive refractive power, and may have a convex object-side surface and a concave image-side surface. Also, an inflection point may be formed on an object-side surface and an image-side surface of the seventh lens 970. The eighth lens 980 may have negative refractive power, and may have a concave object-side surface and a concave image-side surface. Also, an inflection point may be formed on an object-side surface and an image-side surface of the eighth lens 980.

The imaging lens system 900 may further include a filter IF and an imaging plane IP. The filter IF may be disposed between the eighth lens 980 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 18:
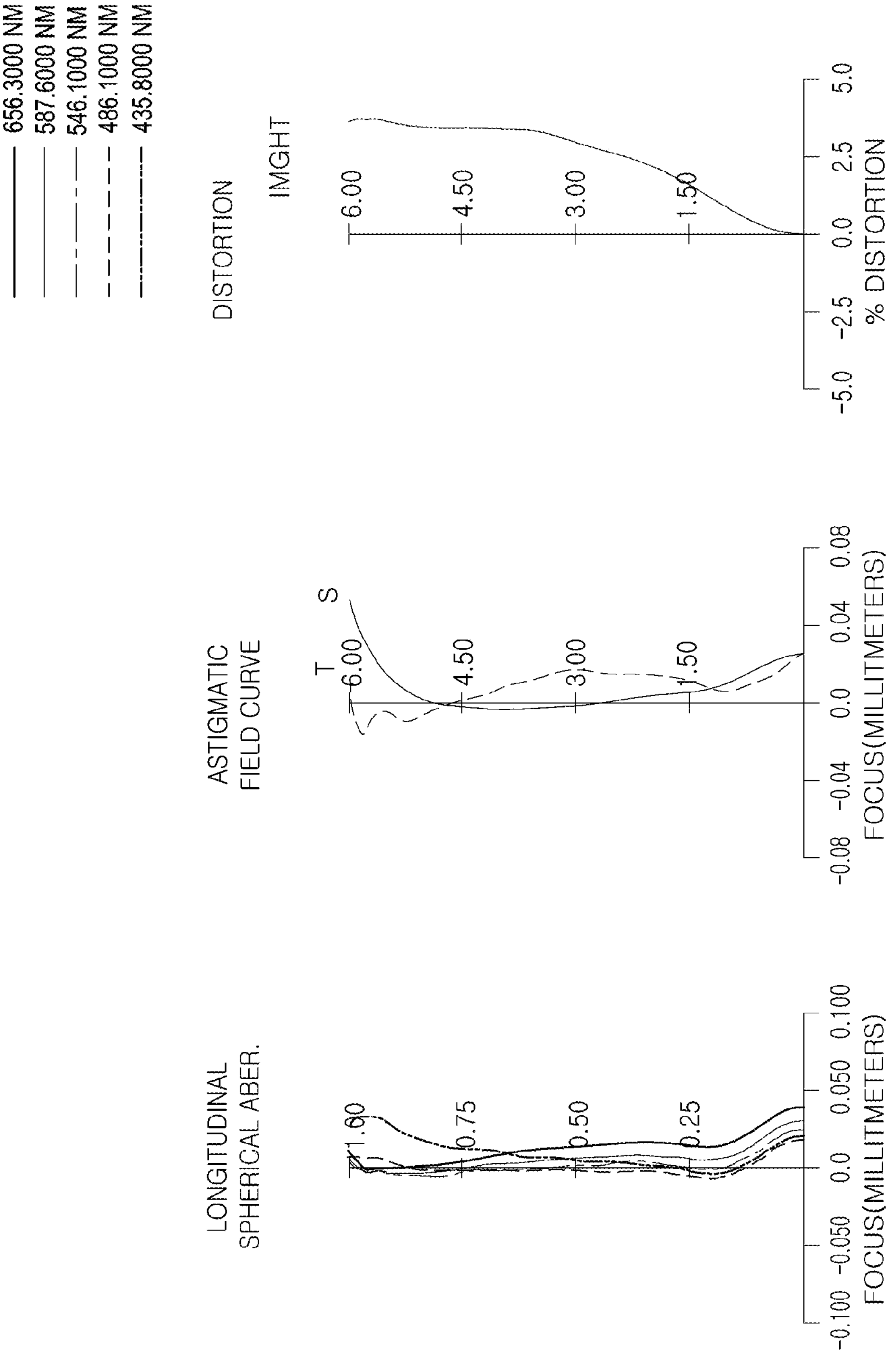
FIG. 18 is aberration curves of the imaging lens system illustrated in FIG. 17.

Tables 17 and 18 list lens characteristics and aspheric values of the imaging lens system according to the present embodiment. FIG. 18 is aberration curves of the imaging lens system according to the present embodiment.

TABLE 17

| Surface No. | Components | Radius of curvature | Thickness/Distance | Refractive index | Abbe number | Effective Radius |
|---|---|---|---|---|---|---|
| S1 | First lens | 2.302 | 1.008 | 1.546 | 55.990 | 1.843 |
| S2 | | 10.058 | 0.058 | | | 1.701 |
| S3 | Second lens | 13.720 | 0.180 | 1.689 | 18.152 | 1.641 |
| S4 | Stop | 5.471 | 0.320 | | | 1.496 |
| S5 | Third lens | 12.762 | 0.352 | 1.546 | 55.990 | 1.459 |
| S6 | | 24.464 | 0.324 | | | 1.409 |
| S7 | Fourth lens | 103.836 | 0.320 | 1.679 | 19.238 | 1.430 |
| S8 | | 25.123 | 0.289 | | | 1.651 |
| S9 | Fifth lens | 16.674 | 0.290 | 1.620 | 25.936 | 1.813 |
| S10 | | 17.781 | 0.554 | | | 2.106 |
| S11 | Sixth lens | 16.580 | 0.348 | 1.571 | 37.403 | 2.883 |
| S12 | | −49.064 | 0.319 | | | 3.124 |
| S13 | Seventh lens | 3.899 | 0.450 | 1.546 | 55.990 | 3.729 |
| S14 | | 6.300 | 0.778 | | | 3.890 |
| S15 | Eighth lens | −4702.338 | 0.430 | 1.537 | 55.735 | 4.460 |
| S16 | | 2.898 | 0.171 | | | 4.657 |
| S17 | Filter | infinity | 0.110 | 1.519 | 64.197 | 5.474 |
| S18 | | infinity | 0.775 | | | 5.516 |
| S19 | Imaging plane | infinity | -0.025 | | | 6.005 |

TABLE 18

| Surface No. | S1 | S2 | S3 | S4 | S5 | S6 | S7 | S8 |
|---|---|---|---|---|---|---|---|---|
| K | −4.21E−01 | 1.67E+01 | 6.45E+01 | 5.37E+00 | 6.96E+01 | 1.49E+01 | 0.00E+00 | 0.00E+00 |
| 4th order term | 7.07E−03 | −2.32E−03 | 5.57E−03 | 5.14E−03 | −1.07E−02 | −1.70E−02 | −3.72E−02 | −3.71E−02 |
| 6th order term | −1.62E−02 | 8.33E−03 | −3.09E−03 | 1.50E−02 | −2.71E−02 | 1.85E−02 | 1.98E−03 | 1.57E−02 |
| 8th order term | 6.29E−02 | −1.75E−02 | 5.95E−02 | −5.46E−02 | 1.40E−01 | −3.74E−02 | −3.10E−02 | −3.54E−02 |
| 10th order term | −1.52E−01 | 2.82E−02 | −2.56E−01 | 1.55E−01 | −3.81E−01 | −1.23E−01 | 1.58E−01 | 4.18E−02 |
| 12th order term | 2.50E−01 | −3.76E−02 | 6.35E−01 | −3.13E−01 | 5.68E−01 | 1.08E+00 | −5.80E−01 | 8.57E−03 |
| 14th order term | −2.90E−01 | 4.45E−02 | −1.04E+00 | 4.54E−01 | −2.63E−01 | −3.47E+00 | 1.39E+00 | −1.48E−01 |
| 16th order term | 2.40E−01 | −4.57E−02 | 1.18E+00 | −4.68E−01 | −6.49E−01 | 6.61E+00 | −2.27E+00 | 3.03E−01 |
| 18th order term | −1.44E−01 | 3.72E−02 | −9.58E−01 | 3.34E−01 | 1.54E+00 | −8.38E+00 | 2.58E+00 | −3.51E−01 |
| 20th order term | 6.27E−02 | −2.22E−02 | 5.61E−01 | −1.55E−01 | −1.68E+00 | 7.31E+00 | −2.09E+00 | 2.65E−01 |
| 22nd order term | −1.96E−02 | 9.32E−03 | −2.35E−01 | 3.86E−02 | 1.13E+00 | −4.42E+00 | 1.19E+00 | −1.35E−01 |

TABLE 18-continued

| | | | | | | | | |
|---|---|---|---|---|---|---|---|---|
| 24th order term | 4.26E−03 | −2.64E−03 | 6.90E−02 | 4.99E−04 | −4.91E−01 | 1.83E+00 | −4.69E−01 | 4.65E−02 |
| 26th order term | −6.15E−04 | 4.79E−04 | −1.34E−02 | −3.43E−03 | 1.35E−01 | −4.91E−01 | 1.21E−01 | −1.03E−02 |
| 28th order term | 5.28E−05 | −5.01E−05 | 1.56E−03 | 9.37E−04 | −2.15E−02 | 7.77E−02 | −1.86E−02 | 1.34E−03 |
| 30th order term | −2.04E−06 | 2.28E−06 | −8.24E−05 | −8.69E−05 | 1.50E−03 | −5.47E−03 | 1.27E−03 | −7.74E−05 |

| Surface No. | S9 | S10 | S11 | S12 | S13 | S14 | S15 | S16 |
|---|---|---|---|---|---|---|---|---|
| K | −7.01E+01 | −9.79E+01 | 0.00E+00 | 9.08E+01 | −1.34E+01 | −1.96E+01 | 9.90E+01 | −1.34E+01 |
| 4th order term | −5.32E−02 | −5.26E−02 | −7.99E−03 | −2.16E−02 | 1.95E−02 | 4.81E−02 | −7.36E−02 | −3.71E−02 |
| 6th order term | −1.78E−02 | −5.69E−03 | −1.54E−02 | −1.70E−02 | −5.50E−02 | −5.59E−02 | 1.71E−02 | 3.08E−03 |
| 8th order term | 1.43E−01 | 5.23E−02 | 3.45E−02 | 4.22E−02 | 4.22E−02 | 3.33E−02 | 2.32E−04 | 3.02E−03 |
| 10th order term | −4.05E−01 | −1.17E−01 | −4.23E−02 | −3.98E−02 | −2.34E−02 | −1.50E−02 | −1.20E−03 | −1.80E−03 |
| 12th order term | 7.17E−01 | 1.60E−01 | 3.21E−02 | 2.26E−02 | 9.13E−03 | 5.08E−03 | 3.49E−04 | 5.38E−04 |
| 14th order term | −8.66E−01 | −1.48E−01 | −1.66E−02 | −8.44E−03 | −2.45E−03 | −1.28E−03 | −5.58E−05 | −1.04E−04 |
| 16th order term | 7.37E−01 | 9.59E−02 | 6.16E−03 | 2.18E−03 | 4.60E−04 | 2.37E−04 | 5.97E−06 | 1.39E−05 |
| 18th order term | −4.50E−01 | −4.44E−02 | −1.66E−03 | −3.96E−04 | −6.12E−05 | −3.23E−05 | −4.59E−07 | −1.31E−06 |
| 20th order term | 1.97E−01 | 1.47E−02 | 3.23E−04 | 5.11E−05 | 5.83E−06 | 3.23E−06 | 2.64E−08 | 8.78E−08 |
| 22nd order term | −6.13E−02 | −3.42E−03 | −4.50E−05 | −4.67E−06 | −3.97E−07 | −2.32E−07 | −1.14E−09 | −4.14E−09 |
| 24th order term | 1.32E−02 | 5.51E−04 | 4.35E−06 | 2.96E−07 | 1.89E−08 | 1.16E−08 | 3.61E−11 | 1.34E−10 |
| 26th order term | −1.87E−03 | −5.79E−05 | −2.76E−07 | −1.24E−08 | −5.97E−10 | −3.84E−10 | −7.92E−13 | −2.83E−12 |
| 28th order term | 1.56E−04 | 3.58E−06 | 1.03E−08 | 3.07E−10 | 1.13E−11 | 7.55E−12 | 1.07E−14 | 3.50E−14 |
| 30th order term | −5.78E−06 | −9.86E−08 | −1.72E−10 | −3.46E−12 | −9.75E−14 | −6.67E−14 | −6.63E−17 | −1.93E−16 |

Figure 19:
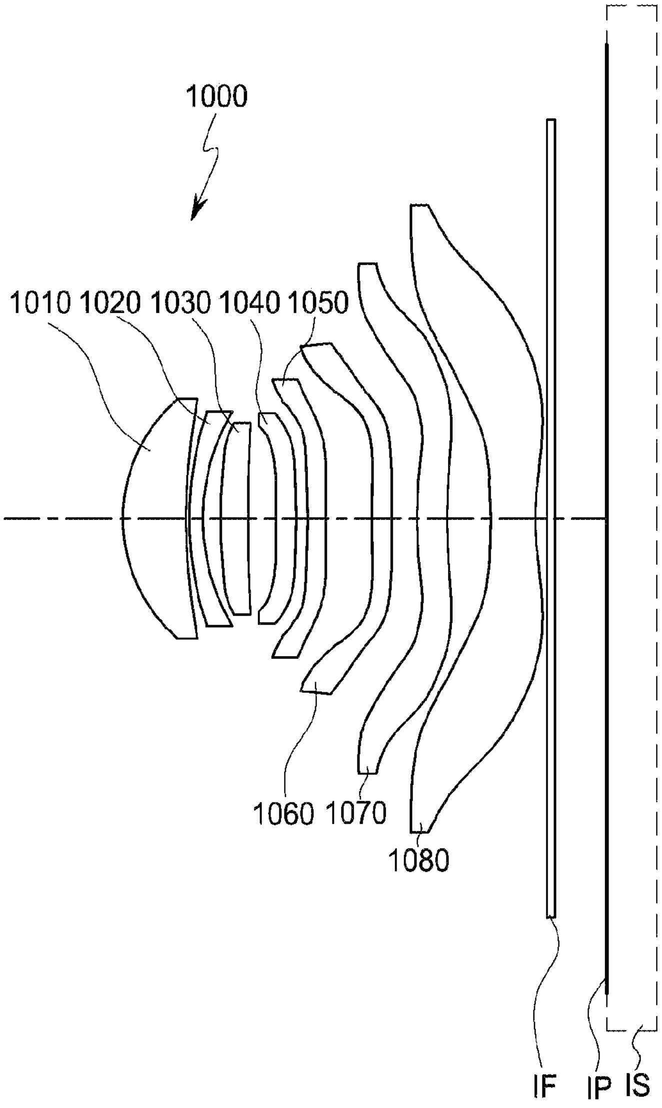
FIG. 19 is a diagram illustrating an imaging lens system according to a tenth embodiment of the present disclosure.

An imaging lens system according to a tenth embodiment will be described with reference to FIG. 19.

The imaging lens system 1000 may include a first lens 1010, a second lens 1020, a third lens 1030, a fourth lens 1040, a fifth lens 1050, a sixth lens 1060, a seventh lens 1070, and an eighth lens 1080.

The first lens 1010 may have positive refractive power, and may have a convex object-side surface and a concave image-side surface. The second lens 1020 may have negative refractive power, and may have a convex object-side surface and a concave image-side surface. The third lens 1030 may have positive refractive power, and may have a convex object-side surface and a concave image-side surface. The fourth lens 1040 may have negative refractive power, and may have a concave object-side surface and a concave image-side surface. The fifth lens 1050 may have positive refractive power, and may have a convex object-side surface and a concave image-side surface. The sixth lens 1060 may have positive refractive power, and may have a convex object-side surface and a concave image-side surface. Also, an inflection point may be formed on an object-side surface and an image-side surface of the sixth lens 1060. The seventh lens 1070 may have positive refractive power, and may have a convex object-side surface and a concave image-side surface. Also, an inflection point may be formed on an object-side surface and an image-side surface of the seventh lens 1070. The eighth lens 1080 may have negative refractive power, and may have a concave object-side surface and a concave image-side surface. Also, an inflection point may be formed on an object-side surface and an image-side surface of the eighth lens 1080.

The imaging lens system 1000 may further include a filter IF and an imaging plane IP. The filter IF may be disposed between the eighth lens 1080 and the imaging plane IP. The filter IF may not be provided if desired. The imaging plane IP may be formed on one surface of the image sensor IS of the camera module or in the image sensor IS. However, the position of the imaging plane IP is not limited to one surface or the inside of the image sensor IS.

Figure 20:
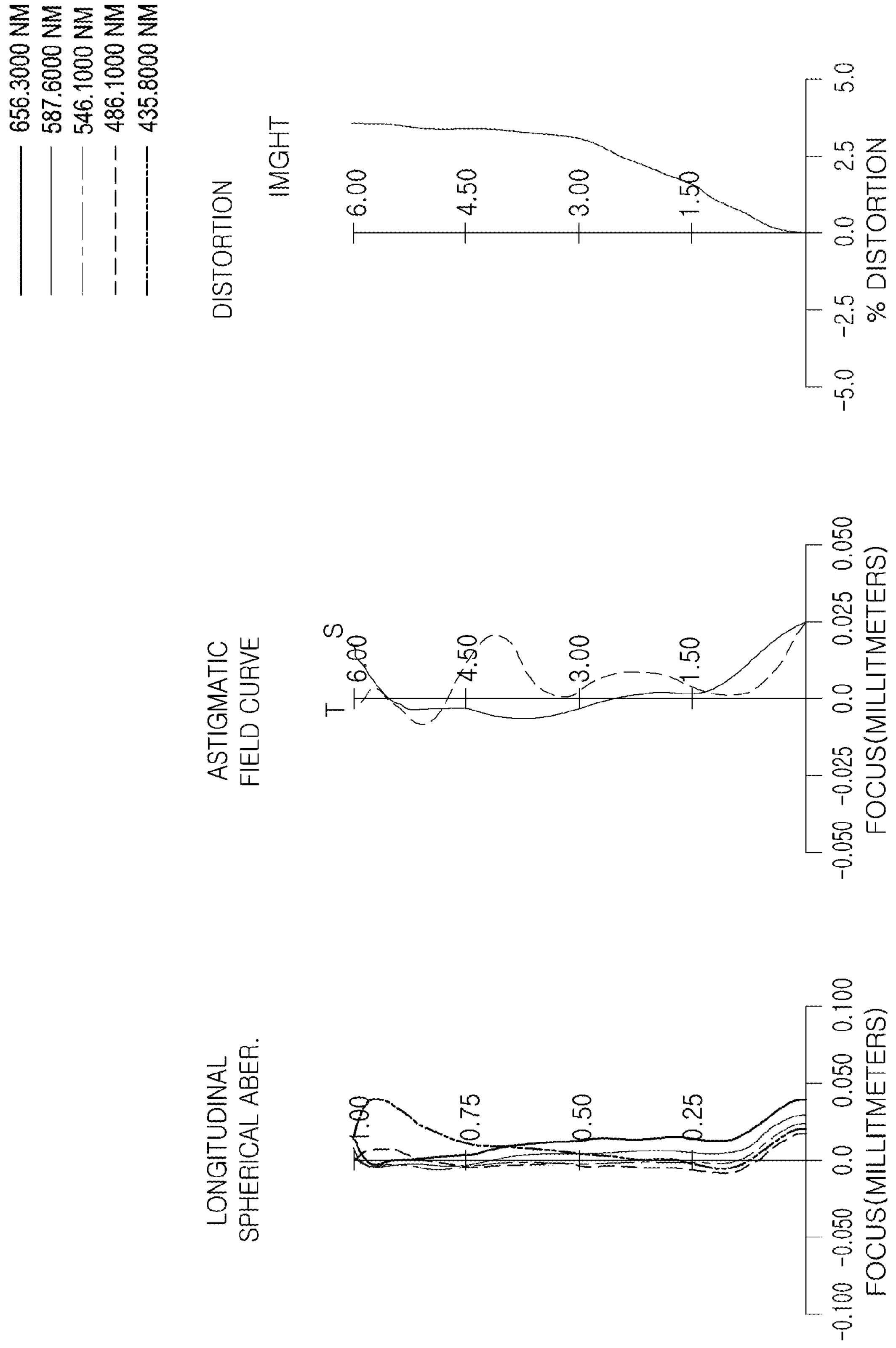
FIG. 20 is aberration curves of the imaging lens system illustrated in FIG. 19.

Tables 19 and 20 list lens characteristics and aspheric values of the imaging lens system according to the present embodiment. FIG. 20 is aberration curves of the imaging lens system according to the present embodiment.

TABLE 19

| Surface No. | Components | Radius of curvature | Thickness/Distance | Refractive index | Abbe number | Effective Radius |
|---|---|---|---|---|---|---|
| S1 | First lens | 2.200 | 0.917 | 1.546 | 55.990 | 1.745 |
| S2 | | 9.509 | 0.060 | | | 1.640 |
| S3 | Second lens | 10.940 | 0.180 | 1.689 | 18.152 | 1.581 |
| S4 | Stop | 4.809 | 0.258 | | | 1.446 |
| S5 | Third lens | 10.088 | 0.395 | 1.571 | 37.403 | 1.419 |
| S6 | | 23.093 | 0.386 | | | 1.310 |
| S7 | Fourth lens | −25.488 | 0.269 | 1.689 | 18.152 | 1.358 |
| S8 | | 75.839 | 0.158 | | | 1.565 |
| S9 | Fifth lens | 16.425 | 0.270 | 1.620 | 25.936 | 1.747 |
| S10 | | 57.234 | 0.633 | | | 2.039 |
| S11 | Sixth lens | 12.834 | 0.300 | 1.620 | 25.936 | 2.350 |
| S12 | | 20.024 | 0.365 | | | 2.671 |
| S13 | Seventh lens | 5.141 | 0.430 | 1.571 | 37.403 | 3.547 |
| S14 | | 9.985 | 0.617 | | | 3.748 |
| S15 | Eighth lens | −16.968 | 0.639 | 1.537 | 55.735 | 4.442 |
| S16 | | 3.552 | 0.159 | | | 4.607 |
| S17 | Filter | infinity | 0.110 | 1.519 | 64.197 | 5.794 |
| S18 | | infinity | 0.770 | | | 5.839 |
| S19 | Imaging plane | infinity | −0.025 | | | 6.002 |

TABLE 20

| Surface No. | S1 | S2 | S3 | S4 | S5 | S6 | S7 | S8 |
|---|---|---|---|---|---|---|---|---|
| K | −5.29E−01 | 1.28E+01 | 4.16E+01 | 5.19E+00 | 4.61E+01 | 8.56E+01 | 0.00E+00 | 0.00E+00 |
| 4th order term | 8.58E−03 | −8.53E−03 | −5.46E−03 | −6.67E−03 | −1.11E−02 | −1.31E−02 | −3.84E−02 | −4.27E−02 |
| 6th order term | −1.99E−02 | 3.71E−02 | 3.86E−02 | 9.14E−02 | −5.78E−02 | −7.26E−03 | −1.80E−02 | 1.98E−02 |
| 8th order term | 8.73E−02 | −1.53E−01 | −1.12E−01 | −5.61E−01 | 4.40E−01 | 1.15E−01 | 4.79E−02 | −1.04E−01 |
| 10th order term | −2.37E−01 | 4.70E−01 | 2.93E−01 | 2.43E+00 | −1.96E+00 | −7.53E−01 | −9.64E−02 | 3.43E−01 |
| 12th order term | 4.39E−01 | −9.96E−01 | −5.69E−01 | −7.11E+00 | 5.79E+00 | 2.90E+00 | −9.87E−02 | −8.04E−01 |
| 14th order term | −5.73E−01 | 1.47E+00 | 7.87E−01 | 1.45E+01 | −1.19E+01 | −7.21E+00 | 1.00E+00 | 1.29E+00 |
| 16th order term | 5.38E−01 | −1.54E+00 | −7.78E−01 | −2.09E+01 | 1.73E+01 | 1.21E+01 | −2.61E+00 | −1.43E+00 |
| 18th order term | −3.66E−01 | 1.16E+00 | 5.56E−01 | 2.18E+01 | −1.82E+01 | −1.42E+01 | 3.92E+00 | 1.10E+00 |
| 20th order term | 1.81E−01 | −6.33E−01 | −2.88E−01 | −1.65E+01 | 1.39E+01 | 1.16E+01 | −3.84E+00 | −5.66E−01 |
| 22nd order term | −6.44E−02 | 2.47E−01 | 1.07E−01 | 8.85E+00 | −7.65E+00 | −6.68E+00 | 2.53E+00 | 1.86E−01 |
| 24th order term | 1.60E−02 | −6.70E−02 | −2.75E−02 | −3.31E+00 | 2.94E+00 | 2.62E+00 | −1.12E+00 | −3.21E−02 |
| 26th order term | −2.64E−03 | 1.20E−02 | 4.65E−03 | 8.19E−01 | −7.53E−01 | −6.68E−01 | 3.16E−01 | 1.78E−04 |

TABLE 20-continued

| | | | | | | | | |
|---|---|---|---|---|---|---|---|---|
| 28th order term | 2.59E−04 | −1.28E−03 | −4.53E−04 | −1.20E−01 | 1.15E−01 | 9.95E−02 | −5.17E−02 | 9.17E−04 |
| 30th order term | −1.15E−05 | 6.14E−05 | 1.85E−05 | 7.89E−03 | −8.00E−03 | −6.56E−03 | 3.72E−03 | −1.11E−04 |

| Surface No. | S9 | S10 | S11 | S12 | S13 | S14 | S15 | S16 |
|---|---|---|---|---|---|---|---|---|
| K | 3.18E+01 | −9.90E+01 | 0.00E+00 | −8.67E+01 | −1.74E+01 | −5.09E+01 | −9.90E+01 | −7.83E+00 |
| 4th order term | −4.61E−02 | −4.09E−02 | −9.31E−03 | −4.53E−03 | 3.73E−02 | 5.99E−02 | −4.04E−02 | −4.13E−02 |
| 6th order term | −1.19E−03 | 7.26E−03 | −7.01E−02 | −9.34E−02 | −1.03E−01 | −9.36E−02 | −1.47E−02 | 4.20E−03 |
| 8th order term | 7.23E−02 | −9.24E−03 | 1.53E−01 | 1.70E−01 | 9.56E−02 | 7.07E−02 | 1.64E−02 | 2.21E−03 |
| 10th order term | −2.53E−01 | 3.41E−02 | −2.17E−01 | −1.93E−01 | −6.14E−02 | −3.77E−02 | −6.23E−03 | −1.34E−03 |
| 12th order term | 5.14E−01 | −8.31E−02 | 1.98E−01 | 1.44E−01 | 2.71E−02 | 1.45E−02 | 1.42E−03 | 3.93E−04 |
| 14th order term | −7.02E−01 | 1.23E−01 | −1.22E−01 | −7.41E−02 | −8.26E−03 | −4.02E−03 | −2.24E−04 | −7.51E−05 |
| 16th order term | 6.72E−01 | −1.19E−01 | 5.19E−02 | 2.67E−02 | 1.76E−03 | 8.04E−04 | 2.56E−05 | 9.83E−06 |
| 18th order term | −4.58E−01 | 7.88E−02 | −1.49E−02 | −6.82E−03 | −2.69E−04 | −1.17E−04 | −2.17E−06 | −8.94E−07 |
| 20th order term | 2.23E−01 | −3.62E−02 | 2.78E−03 | 1.23E−03 | 2.94E−05 | 1.23E−05 | 1.37E−07 | 5.65E−08 |
| 22nd order term | −7.67E−02 | 1.15E−02 | −2.94E−04 | −1.54E−04 | −2.30E−06 | −9.33E−07 | −6.32E−09 | −2.44E−09 |
| 24th order term | 1.82E−02 | −2.47E−03 | 6.66E−06 | 1.31E−05 | 1.25E−07 | 4.92E−08 | 2.07E−10 | 7.00E−11 |
| 26th order term | −2.81E−03 | 3.41E−04 | 2.30E−06 | −7.19E−07 | −4.55E−09 | −1.72E−09 | −4.53E−12 | −1.24E−12 |
| 28th order term | 2.55E−04 | −2.74E−05 | −2.70E−07 | 2.27E−08 | 9.85E−11 | 3.58E−11 | 5.96E−14 | 1.18E−14 |
| 30th order term | −1.02E−05 | 9.66E−07 | 9.78E−09 | −3.09E−10 | −9.66E−13 | −3.35E−13 | −3.54E−16 | −4.20E−17 |

Tables 21 to 23 list optical characteristic values and conditional expression values of the imaging lens systems according to the first to fifth embodiments.

TABLE 21

| Elements | First embodiment | Second embodiment | Third embodiment | Fourth embodiment | Fifth embodiment |
|---|---|---|---|---|---|
| f1 | 6.0754 | 5.9770 | 6.1451 | 5.9012 | 6.2555 |
| f2 | −14.693 | −14.284 | −15.840 | −14.123 | −14.001 |
| f3 | 51.3127 | 57.8488 | 24.0928 | 25.8237 | 25.2523 |
| f4 | −30.2980 | −32.4058 | −33.8866 | −36.5659 | −50.6518 |
| f5 | 56.6951 | 59.0959 | 31.2333 | 34.6066 | 78.8840 |
| f6 | −79.2923 | −682.013 | 217.664 | −82.8031 | 355.530 |
| f7 | 6.5144 | 7.0985 | 12.1093 | 9.2517 | 8.0119 |
| f8 | −5.0707 | −5.0927 | −4.8207 | −4.8060 | −4.5466 |
| TTL | 8.0000 | 7.9995 | 7.0901 | 7.0896 | 7.4194 |
| BFL | 1.2412 | 1.2415 | 0.9821 | 1.0171 | 1.0011 |
| f | 6.5510 | 6.5740 | 6.2800 | 6.3184 | 6.3387 |

TABLE 21-continued

| | | | | | |
|---|---|---|---|---|---|
| f-number | 1.5700 | 1.5700 | 1.6700 | 1.6700 | 1.6500 |
| IMG HT | 6.1290 | 6.1290 | 6.0000 | 6.0000 | 6.0000 |
| HFOV(°) | 42.500 | 42.356 | 42.642 | 42.640 | 42.647 |

| Elements | Sixth embodiment | Seventh embodiment | Eighth embodiment | Ninth embodiment | Tenth embodiment |
|---|---|---|---|---|---|
| f1 | 5.064 | 8.926 | 8.990 | 5.224 | 5.016 |
| f2 | −13.310 | 13.429 | 13.233 | −13.322 | −12.603 |
| f3 | 47.096 | −15.263 | −13.542 | 48.324 | 31.043 |
| f4 | −46.682 | 34.642 | 25.349 | −48.897 | −27.652 |
| f5 | 42.414 | −25.451 | −37.901 | 392.743 | 37.059 |
| f6 | 23.989 | 34.169 | 135.928 | 21.755 | 56.741 |
| f7 | 20.572 | 15.336 | 11.018 | 17.569 | 17.991 |
| f8 | −4.764 | −5.426 | −4.925 | −5.391 | −5.409 |
| TTL | 6.8900 | 7.0500 | 7.0500 | 7.0500 | 6.8900 |
| BFL | 0.9993 | 1.0360 | 1.0741 | 1.0308 | 1.0140 |
| f | 6.3082 | 6.4134 | 6.4036 | 6.3095 | 6.3148 |
| f-number | 1.7900 | 1.7900 | 1.7900 | 1.7900 | 1.8900 |
| IMG HT | 6.0000 | 6.1200 | 6.1200 | 6.0000 | 6.0000 |
| HFOV(°) | 85.301 | 85.303 | 85.283 | 85.313 | 85.300 |

TABLE 22

| Conditional expression | First embodiment | Second embodiment | Third embodiment | Fourth embodiment | Fifth embodiment |
|---|---|---|---|---|---|
| f-number | 1.5700 | 1.5700 | 1.6700 | 1.6700 | 1.6500 |
| TTL/2ImgHT | 0.6526 | 0.6526 | 0.5908 | 0.5908 | 0.6183 |
| f/f1 | 1.0783 | 1.0999 | 1.0219 | 1.0707 | 1.0133 |
| \|f/f2\| | 0.4459 | 0.4602 | 0.3965 | 0.4474 | 0.4527 |
| \|f/f3\| | 0.1277 | 0.1136 | 0.2607 | 0.2447 | 0.2510 |
| \|f/f4\| | 0.2162 | 0.2029 | 0.1853 | 0.1728 | 0.1251 |
| \|f/f5\| | 0.1155 | 0.1112 | 0.2011 | 0.1826 | 0.0803 |
| \|f/f6\| | 0.0826 | 0.0096 | 0.0289 | 0.0763 | 0.0178 |
| \|f/f7\| | 1.0056 | 0.9261 | 0.5186 | 0.6829 | 0.7558 |
| \|f/f8\| | 1.2919 | 1.2909 | 1.3027 | 1.3147 | 1.3942 |
| \|f2/f8\| | 2.8976 | 2.8047 | 3.2858 | 2.9387 | 3.0794 |
| (\|f2\| + \|f8\|)/f | 3.0169 | 2.9474 | 3.2899 | 2.9959 | 2.9261 |
| (\|f1\| + \|f2\| + \|f7\| + \|f8\|)/f | 4.9387 | 4.9364 | 6.1967 | 5.3941 | 5.2361 |
| G12/G45 | 0.4670 | 0.5000 | 0.4329 | 0.5173 | 0.3963 |
| G23/G34 | 1.3795 | 1.4985 | 0.6687 | 0.7207 | 0.7693 |
| G56/G78 | 0.5310 | 0.5502 | 0.7446 | 0.6826 | 0.5596 |
| T1/G78 | 1.1435 | 1.1838 | 1.3001 | 1.1930 | 1.0872 |
| T6/G78 | 0.4569 | 0.4695 | 0.4000 | 0.3578 | 0.4179 |
| D15/(G56 + D68) | 1.0753 | 1.0649 | 1.0393 | 1.0047 | 1.0231 |
| R10/f5 | −1.3945 | −14.3902 | −0.8542 | −1.6732 | −0.8804 |
| (R2 + R4)/(R6 + R8) | 0.3694 | 0.3477 | 0.3555 | 0.3893 | 0.2770 |
| (R11 + R12)/(2*R12) | 1.2411 | 1.0375 | 0.9781 | 1.0801 | 0.9875 |
| Nd2 + Nd3 | 3.2252 | 3.2252 | 3.2355 | 3.2355 | 3.2599 |
| Nd4 + Nd5 | 3.2252 | 3.2252 | 3.2599 | 3.2599 | 3.2352 |

TABLE 23

| Conditional expression | Sixth embodiment | Seventh embodiment | Eighth embodiment | Ninth embodiment | Tenth embodiment |
|---|---|---|---|---|---|
| f-number | 1.7900 | 1.7900 | 1.7900 | 1.7900 | 1.8900 |
| TTL/2ImgHT | 0.5741 | 0.5803 | 0.5759 | 0.5875 | 0.5741 |
| f/f1 | 1.2457 | 0.7185 | 0.7123 | 1.2077 | 1.2588 |
| \|f/f2\| | 0.4740 | 0.4776 | 0.4839 | 0.4736 | 0.5011 |
| \|f/f3\| | 0.1339 | 0.4202 | 0.4729 | 0.1306 | 0.2034 |
| \|f/f4\| | 0.1351 | 0.1851 | 0.2526 | 0.1290 | 0.2284 |
| \|f/f5\| | 0.1487 | 0.2520 | 0.1690 | 0.0161 | 0.1704 |
| \|f/f6\| | 0.2630 | 0.1877 | 0.0471 | 0.2900 | 0.1113 |
| \|f/f7\| | 0.3066 | 0.4182 | 0.5812 | 0.3591 | 0.3510 |
| \|f/f8\| | 1.3241 | 1.1819 | 1.3003 | 1.1703 | 1.1675 |
| \|f2/f8\| | 2.7938 | 2.4747 | 2.6871 | 2.4710 | 2.3300 |
| (\|f2\| + \|f8\|)/f | 2.8651 | 2.9400 | 2.8355 | 2.9660 | 2.8522 |
| (\|f1\| + \|f2\| + \|f7\| + \|f8\|)/f | 6.9291 | 6.7231 | 5.9599 | 6.5785 | 6.4956 |
| G12/G45 | 0.1825 | 0.1296 | 0.1893 | 0.1988 | 0.3794 |

TABLE 23-continued

| Conditional expression | Sixth embodiment | Seventh embodiment | Eighth embodiment | Ninth embodiment | Tenth embodiment |
|---|---|---|---|---|---|
| G23/G34 | 1.0171 | 0.1884 | 0.3872 | 0.9883 | 0.6680 |
| G56/G78 | 1.2075 | 0.1472 | 0.2116 | 0.7120 | 1.0269 |
| T1/G78 | 1.7236 | 0.3186 | 0.3925 | 1.2949 | 1.4876 |
| T6/G78 | 0.5735 | 0.2346 | 0.3501 | 0.4467 | 0.4865 |
| D15/(G56 + D68) | 1.0405 | 0.8089 | 0.8426 | 1.0907 | 0.9696 |
| R10/f5 | 0.4221 | −0.6858 | −0.6980 | 0.0453 | 1.5444 |
| (R2 + R4)/(R6 + R8) | 0.3756 | 1.0670 | 1.3093 | 0.3132 | 0.1447 |
| (R11 + R12)/(2*R12) | 0.0930 | 0.8481 | 0.9291 | 0.3310 | 0.8205 |
| Nd2 + Nd3 | 3.2355 | 3.2355 | 3.2355 | 3.2355 | 3.2599 |
| Nd4 + Nd5 | 3.2989 | 3.2263 | 3.2263 | 3.2989 | 3.3092 |

According to the aforementioned embodiments, the imaging lens system may obtain high-resolution images and videos even in a low-light environment.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:

a first lens, a second lens, a third lens, a fourth lens, a fifth lens, a sixth lens, a seventh lens, and an eighth lens disposed in order from an object side, wherein the fourth lens and the sixth lens each have a concave image-side surface in a paraxial region, wherein the fifth lens has a convex object-side surface in a paraxial region and a convex image-side surface in a paraxial region, and wherein the imaging lens system satisfies conditional expressions as below:

$$f\text{-number} < 1.70$$

$$0/90 < f/f1 < 1.10$$

$$1.0 < |f/f8| < 1.40$$

where f is a focal length of the imaging lens system, f1 is a focal length of the first lens, and f8 is a focal length of the eighth lens.

2. The imaging lens system of claim 1, wherein the first lens has a concave image-side surface in a paraxial region.

3. The imaging lens system of claim 1, wherein the second lens has a convex object-side surface in a paraxial region.

4. The imaging lens system of claim 1, wherein the third lens has positive refractive power.

5. The imaging lens system of claim 1, wherein the imaging lens system satisfies a conditional expression as below:

$$0.08<|f/f5|<0.30$$

where f5 is a focal length of the fifth lens.

6. The imaging lens system of claim 1, wherein the imaging lens system satisfies a conditional expression as below:

$$0.005 < |f/f6| < 0.10$$

where f6 is a focal length of the sixth lens.

7. The imaging lens system of claim 1, wherein the imaging lens system satisfies a conditional expression as below:

$$0.40 < |f/f7| < 1.20$$

where f7 is a focal length of the seventh lens.

8. The imaging lens system of claim 1, wherein the imaging lens system satisfies a conditional expression as below:

$$0.580 < TTL/2ImgHT < 0.660$$

where TTL is a distance from an object-side surface of the first lens to an imaging plane, and 2ImgHT is a diagonal length of the imaging plane.

* * * * *